United States Patent [19]

Miyake et al.

[11] Patent Number: 5,088,351
[45] Date of Patent: Feb. 18, 1992

[54] VEHICLE SPEED CONTROL SYSTEM FOR MOTOR VEHICLE HAVING AN AUTOMATIC TRANSMISSION CONTROL SYSTEM

[75] Inventors: Osamu Miyake, Aichi; Nobuyasu Suzumura, Toyota; Shoji Kawata, Okazaki, all of Japan

[73] Assignee: Aisin Seiki Kabushiki Kaisha, Kariya, Japan

[21] Appl. No.: 528,335

[22] Filed: May 29, 1990

Related U.S. Application Data

[63] Continuation of Ser. No. 126,901, Nov. 30, 1987, abandoned.

[30] Foreign Application Priority Data

| Nov. 29, 1986 | [JP] | Japan | 61-285233 |
| Nov. 29, 1986 | [JP] | Japan | 61-285234 |
| Nov. 29, 1986 | [JP] | Japan | 61-285235 |
| Nov. 29, 1986 | [JP] | Japan | 61-285236 |
| Nov. 29, 1986 | [JP] | Japan | 61-285237 |
| Nov. 29, 1986 | [JP] | Japan | 61-285238 |

[51] Int. Cl.$^5$ ............................................. B60K 41/06
[52] U.S. Cl. ........................................................ 74/866
[58] Field of Search ............... 74/859, 860, 862, 866, 74/872, 877; 364/424.1; 180/176-179

[56] References Cited

U.S. PATENT DOCUMENTS

| 4,285,252 | 8/1981 | Yamaki et al. | 74/862 X |
| 4,408,293 | 10/1983 | Avins | 180/179 X |
| 4,471,438 | 9/1984 | Futagi et al. | 74/866 X |
| 4,499,542 | 2/1985 | Hamajima et al. | 74/866 X |
| 4,506,752 | 3/1985 | Hara et al. | 180/179 |
| 4,516,652 | 5/1985 | Tanigawa et al. | 74/866 X |
| 4,573,375 | 3/1986 | Hamada et al. | 74/866 X |
| 4,635,508 | 1/1987 | Tatsumi | 74/866 |
| 4,649,775 | 3/1987 | Ootani | 74/866 |
| 4,667,541 | 5/1987 | Shimaoka et al. | 74/866 |
| 4,716,789 | 1/1988 | Suzuki | |
| 4,718,309 | 1/1988 | Moriya | 74/866 |
| 4,730,519 | 3/1988 | Nakamura et al. | 74/866 |
| 4,744,031 | 5/1988 | Takeda et al. | 74/866 X |
| 4,776,239 | 10/1988 | Sassi et al. | 74/866 |
| 4,905,786 | 3/1990 | Miyake et al. | 180/179 |
| 4,914,597 | 4/1990 | Moncelle et al. | 180/179 X |
| 4,933,859 | 6/1990 | Tsamyama et al. | 180/179 X |

FOREIGN PATENT DOCUMENTS

| 60-1031 | 1/1985 | Japan |
| 61-218442 | 9/1986 | Japan |
| 61-238523 | 10/1986 | Japan |
| 61-238531 | 10/1986 | Japan |

Primary Examiner—Dwight Diehl
Attorney, Agent, or Firm—Finnegan, Henderson, Farabow, Garrett and Dunner

[57] ABSTRACT

A vehicle speed control system comprising an automatic speed control system for controlling the vehicle velocity to a set velocity selected by an operator, and automatic transmission control system for controlling the speed stage of the automatic transmission of the vehicle in response to the deviation between the actual vehicle velocity and the set vehicle velocity of the automatic speed control means. The automatic transmission control system comprises two operating modes including a first mode when the automatic speed control system is controlling the vehicle velocity, and a second mode when the automatic speed control system is not controlling the vehicle velocity, and the automatic transmission control system prohibits the shift of the speed stage to a fixed speed stage when the automatic speed control system is controlling the vehicle velocity. The automatic speed control system does not detect a shift of the speed stage when the automatic speed control system is controlling the throttle valve during shifting of the speed stage. The automatic speed control system controls a throttle valve in response to an abnormal state of the transmission.

13 Claims, 32 Drawing Sheets

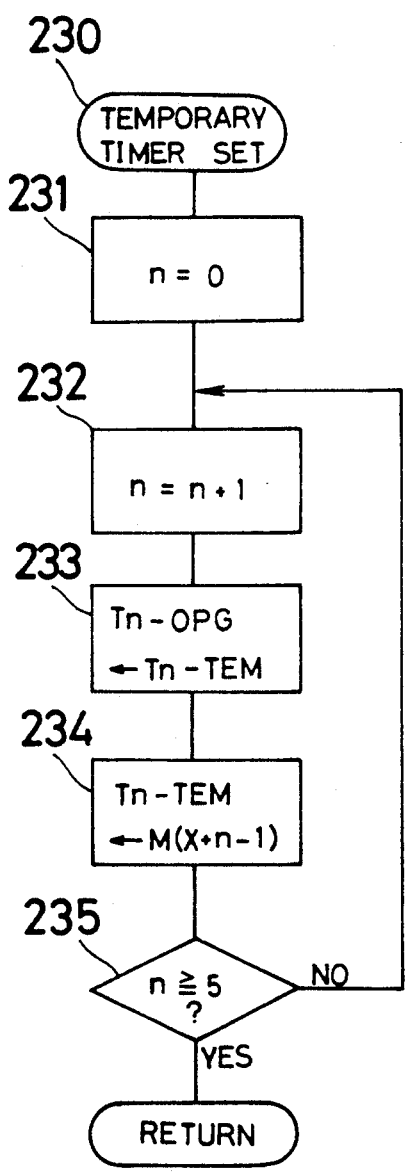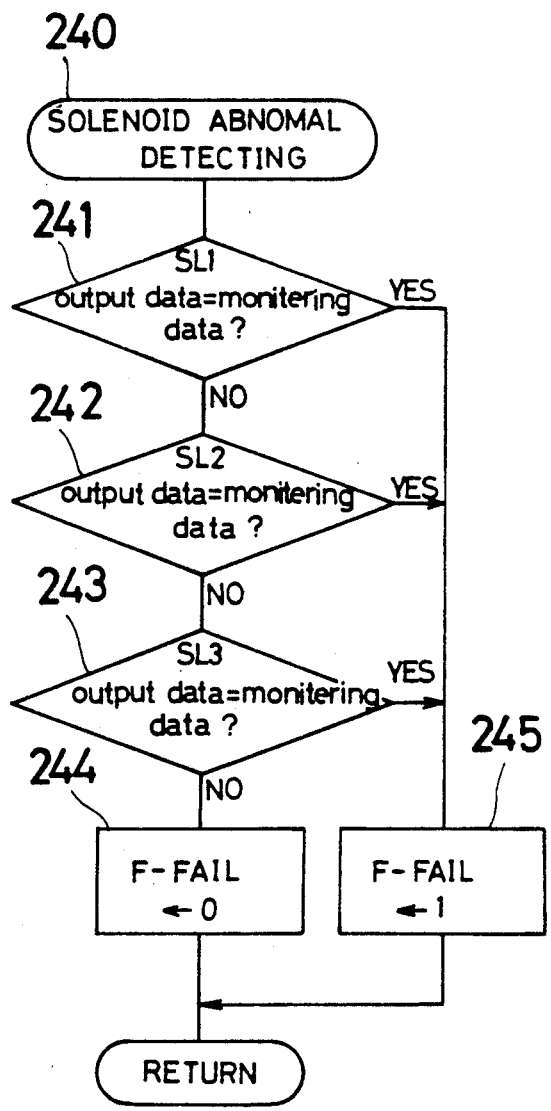

| Vc (Km/h) | speed stages | maximum torque(Kg) |
|---|---|---|
| 40 | 2nd | 150 |
| | 3rd | 40 |
| | O/D | 0 |
| 50 | 2nd | 180 |
| | 3rd | 45 |
| | O/D | 25 |
| 60 | 2nd | 180 |
| | 3rd | 75 |
| | O/D | 30 |
| 70 | 2nd | 200 |
| | 3rd | 100 |
| | O/D | 30 |
| 80 | 2nd | 250 |
| | 3rd | 150 |
| | O/D | 40 |
| 90 | 2nd | 240 |
| | 3rd | 210 |
| | O/D | 40 |

Fig. 22

[UNIT S]

| kind of shift | | lockup state at last state | desired shifting gear | TD1 deviation Vdev is large (Vdev≥3Km/h) | | | | | TD2 deviation Vdev is small | | | (Vdev<3Km/h) | |
|---|---|---|---|---|---|---|---|---|---|---|---|---|---|
| | | | | T1 | T2 | T3 | T4 | T5 | T1 | T2 | T3 | T4 | T5 |
| up-shifting | throttle TH3 ~TH7 | lockup clutch disengaged | 1~3 | 200 | 400 | 800 | 100 | 800 | — | — | — | — | — |
| | | | O/D | 200 | 250 | 700 | 100 | 600 | — | — | — | — | — |
| | | — | 1~3 | 0 | 0 | 850 | 0 | 750 | — | — | — | — | — |
| | | — | O/D | 0 | 0 | 750 | 0 | 550 | — | — | — | — | — |
| | TH0 ~TH2 | — | 1~3 | 200 | 0 | 750 | 100 | 750 | — | — | — | — | — |
| | | — | O/D | 200 | 0 | 650 | 100 | 650 | — | — | — | — | — |
| down shifting | — | — | 1~2 | 300 | 0 | 750 | 200 | 750 | 4300 | 4000 | 4750 | 4200 | 4750 |
| | | — | 3 | 200 | 0 | 850 | 100 | 850 | 4200 | 4000 | 4850 | 4100 | 4850 |

| Index 0 vehicle velocity 40Km/h | | | | Torque [Kg] |
|---|---|---|---|---|
| throttle opening | speed stages | | | |
| | 1st | 2nd | 3rd | O/D |
| TH7 | 500 | 300 | 250 | 200 |
| TH6 | 350 | 250 | 210 | 170 |
| TH5 | 200 | 190 | 160 | 130 |
| TH4 | 70 | 100 | 100 | 100 |
| TH3 | 30 | 60 | 60 | 70 |
| TH2 | 0 | 20 | 30 | 40 |
| TH1 | 0 | 0 | 10 | 10 |
| TH0 | 0 | 0 | 0 | 5 |

(b)

| Index 1 vehicle velocity 50Km/h | | | | Torque [Kg] |
|---|---|---|---|---|
| throttle opening | speed stages | | | |
| | 1st | 2nd | 3rd | O/D |
| TH7 | 490 | 300 | 220 | 180 |
| TH6 | 340 | 240 | 180 | 150 |
| TH5 | 190 | 170 | 130 | 110 |
| TH4 | 100 | 50 | 80 | 80 |
| TH3 | 50 | 30 | 50 | 50 |
| TH2 | 20 | 10 | 30 | 20 |
| TH1 | 0 | 0 | 10 | 10 |
| TH0 | 0 | 0 | 0 | 0 |

(c)

| Index 2 vehicle velocity 60Km/h | | | | Torque [Kg] |
|---|---|---|---|---|
| throttle opening | speed stages | | | |
| | 1st | 2nd | 3rd | O/D |
| TH7 | 200 | 310 | 200 | 150 |
| TH6 | 50 | 250 | 160 | 120 |
| TH5 | 0 | 170 | 110 | 80 |
| TH4 | 0 | 80 | 60 | 50 |
| TH3 | 0 | 0 | 10 | 20 |
| TH2 | 0 | 0 | 0 | 0 |
| TH1 | 0 | 0 | 0 | 0 |
| TH0 | 0 | 0 | 0 | 0 |

(d)

| Index 3 vehicle velocity 70Km/h | | | | Torque [Kg] |
|---|---|---|---|---|
| throttle opening | speed stages | | | |
| | 1st | 2nd | 3rd | O/D |
| TH7 | 0 | 320 | 210 | 140 |
| TH6 | 0 | 260 | 170 | 110 |
| TH5 | 0 | 160 | 110 | 70 |
| TH4 | 0 | 50 | 60 | 40 |
| TH3 | 0 | 0 | 10 | 10 |
| TH2 | 0 | 0 | 0 | 0 |
| TH1 | 0 | 0 | 0 | 0 |
| TH0 | 0 | 0 | 0 | 0 |

(e)

| Index 4 vehicle velocity 80Km/h | | | | Torque [Kg] |
|---|---|---|---|---|
| throttle opening | speed stages | | | |
| | 1st | 2nd | 3rd | O/D |
| TH7 | 0 | 290 | 220 | 130 |
| TH6 | 0 | 230 | 180 | 110 |
| TH5 | 0 | 130 | 120 | 60 |
| TH4 | 0 | 20 | 70 | 30 |
| TH3 | 0 | 0 | 20 | 10 |
| TH2 | 0 | 0 | 0 | 0 |
| TH1 | 0 | 0 | 0 | 0 |
| TH0 | 0 | 0 | 0 | 0 |

(f)

| Index 5 vehicle velocity 90Km/h | | | | Torque [Kg] |
|---|---|---|---|---|
| throttle opening | speed stages | | | |
| | 1st | 2nd | 3rd | O/D |
| TH7 | 0 | 250 | 220 | 130 |
| TH6 | 0 | 190 | 180 | 110 |
| TH5 | 0 | 90 | 110 | 60 |
| TH4 | 0 | 0 | 60 | 30 |
| TH3 | 0 | 0 | 0 | 10 |
| TH2 | 0 | 0 | 0 | 0 |
| TH1 | 0 | 0 | 0 | 0 |
| TH0 | 0 | 0 | 0 | 0 |

Fig. 30

ECT shift diagram

| throttle opening | Change of speed stages | | | | | |
|---|---|---|---|---|---|---|
| | 1 - 2 | 2 - 3 | 3 - O/D | O/D - 3 | 3 - 2 | 2 - 1 |
| TH7 | 1000 | 1850 | 2700 | 2600 | 1300 | 850 |
| TH6 | 800 | 1600 | 2100 | 1850 | 950 | 250 |
| TH5 | 700 | 1200 | 1700 | 1250 | 750 | 200 |
| TH4 | 550 | 1000 | 1450 | 950 | 500 | 200 |
| TH3 | 400 | 800 | 1200 | 800 | 450 | 200 |
| TH2 | 350 | 700 | 1000 | 750 | 450 | 200 |
| TH1 | 250 | 500 | 750 | 600 | 400 | 200 |
| TH0 | 250 | 400 | 700 | 400 | 350 | 200 | output of speed sensor [RPM]

Fig. 31

ECT lockup diagram

| throttle opening | lockup state | | | | | |
|---|---|---|---|---|---|---|
| | 2nd engaged | 3rd engaged | O/D engaged | O/D disengaged | 3rd disengaged | 2nd disengaged |
| TH7 | 800 | 1200 | 1700 | 1600 | 1050 | 700 |
| TH6 | 800 | 1200 | 1700 | 1600 | 1050 | 700 |
| TH5 | 800 | 1200 | 1700 | 1600 | 1050 | 700 |
| TH4 | 800 | 1200 | 1700 | 1600 | 1000 | 700 |
| TH3 | 800 | 1000 | 1600 | 1250 | 850 | 700 |
| TH2 | 800 | 1000 | 1300 | 1000 | 850 | 700 |
| TH1 | 800 | 1000 | 1150 | 1000 | 850 | 700 |
| TH0 | 800 | 1000 | 1000 | 1000 | 850 | 700 | output of speed sensor [RPM]

Fig. 32

ECT-A/D shift diagram

| throttle opening | change of speed stages | | | | | |
|---|---|---|---|---|---|---|
| | 1-2 | 2-3 | 3-O/D | O/D-3 | 3-2 | 2-1 |
| TH 7 | 1200 | 2200 | 3200 | 2700 | 2100 | 850 |
| TH 6 | 1000 | 1950 | 3000 | 1950 | 1650 | 700 |
| TH 5 | 900 | 1700 | 2400 | 1400 | 1300 | 600 |
| TH 4 | 850 | 1500 | 2300 | 1200 | 800 | 500 |
| TH 3 | 650 | 1200 | 2000 | 1000 | 600 | 350 |
| TH 2 | 450 | 750 | 1500 | 800 | 450 | 250 |
| TH 1 | 300 | 550 | 900 | 650 | 400 | 200 |
| TH 0 | 250 | 500 | 800 | 400 | 350 | 200 | output of speed sensor [RPM]

Fig. 33

ECT-A/D lockup diagram

| throttle opening | lockup state | | | | | |
|---|---|---|---|---|---|---|
| | 2nd engaged | 3rd engaged | O/D engaged | O/D disengaged | 3rd disengaged | 2nd disengaged |
| TH7 | 800 | 2200 | 3150 | 3000 | 2150 | 700 |
| TH6 | 800 | 1950 | 2800 | 2600 | 1900 | 700 |
| TH5 | 800 | 1600 | 2150 | 2000 | 1500 | 700 |
| TH4 | 800 | 1400 | 1900 | 1800 | 1000 | 700 |
| TH3 | 800 | 1350 | 1750 | 1500 | 850 | 700 |
| TH2 | 800 | 1350 | 1600 | 1000 | 850 | 700 |
| TH1 | 800 | 1350 | 1350 | 1000 | 850 | 700 |
| TH0 | 800 | 1350 | 1350 | 1000 | 850 | 700 | output of speed sensor [RPM]

Fig. 37 (A TABLE OF VARIABLES No.1)

| | | |
|---|---|---|
| VARIABLES | Vdev | A deviation of the vehicle velocty |
| | Vc | A present vehicle velocity |
| | Vset | A setting vehicle velocity |
| | TH | A present throttle opening |
| | THOUT | A target of the throttle opening |
| | TH-REV | A revised throttle opening |
| | NSHFT | A present shift position |
| | TRQ | A calculated torque |
| | TN | A present torque |
| | n | A variable |
| | Ps | An address pointer of the shift diagram |
| | Pl | An address pointer of the lockup diagram |
| | T1-TEM~T5-TEM | A temporary value of the timer |
| | T1-ORG~T5-ORG | An old value of the timer |
| | TH-PAST | A former value of the throttle opening degree |
| | TH-CHK | A number of times of a change of the throttle opening degree |
| REGISTERS | A | A register A |
| | B | A register B |
| | X | An index register |
| | CARRY | carry |
| | M(X) | A memory appointed by the index register |
| TIMERS | T-T1~T-T5 | A shift timer |
| | T-DEL-UP | An up shift delay timer |
| | T-DIS-UP | An up shift disallowance timer |
| | T-DEL-MODE | A mode change delay timer |
| FLAGS | F-A/D-SET | An auto drive set flag |
| | F-A/D-CAN | An auto drive cancel flag |
| | F-ECT-A/D | An ECT-A/D mode flag |

Fig. 38 (A TABLE OF VARIABLES No.2)

|  |  |  |
|---|---|---|
| F L A G S | F-ACC | An accelerator flag |
|  | F-ACC-SEN | An accelerator detecting flag |
|  | F-EN-L/C | A lockup allowance flag |
|  | F-DIS-L/C | A lockup disallowance flag |
|  | F-DWN | A down shift flag |
|  | F-DIS-UP | An up shift disallowance flag |
|  | F-DEL-UP | An up shift delay flag |
|  | F-TH-HLD | A throttle holding flag |
|  | F-FAIL | A fail detecting flag |
|  | SW-A/D-MAIN | A state of A/D main switch |
|  | SW-PKB | A state of parking brake switch |
|  | SW-BK | A state of brake switch |
|  | SW-D | A state of range D switch |
|  | SW-A/D-SET | A state of set switch |
|  | SW-A/D-RES | A state of resume switch |
| C O N S T A N T S | TBL-MT | A head address of the max torque data |
|  | TABLESIZ1 | A size of the torque data |
|  | TABLESIZ2 | A size of the torque data |
|  | ECT-SMAP | A head address of the ECT shift data |
|  | ECT-LMAP | A head address of the ECT lockup data |
|  | ECT-A/D-SMAP | A head address of the ECT-A/D shift data |
|  | ECT-A/D-LMAP | A head address of the ECT-A/D lockup data |
|  | ECT-UT | A head address of the ECT up timer data |
|  | ECT-DT | A head address of the ECT down timer data |
|  | ECT-A/D-UT | A head address of the ECT-A/D up timer data |
|  | ECT-A/D-DT | A head address of the ECT-A/D down timer data |
|  | ECT-T | A head address of the shift timer data |
|  | THmax | A maximum value of the variable TH |

VEHICLE SPEED CONTROL SYSTEM FOR MOTOR VEHICLE HAVING AN AUTOMATIC TRANSMISSION CONTROL SYSTEM

This application is a continuation of application Ser. No. 07/126,901 filed Nov. 30, 1987, abandoned.

BACKGROUND OF THE INVENTION

1. Field of the Invention

The present invention relates generally to a vehicle speed control system for a motor vehicle having an automatic transmission control system and an automatic speed control system.

2. Description of the Prior Art

Typical conventional vehicle speed control systems include the following:

A device for controlling a lockup clutch to disengage according to the vehicle velocity at the time the automatic speed control system is controlling the vehicle velocity because of antihunting of the vehicle, is shown in the Japanese Laid-open Patent Application Publication No. SHO61-218442, dated Sept. 27, 1986.

A device for down-shifting the automatic transmission gear according to the acceleration of the vehicle during the time the automatic speed control system is controlling the vehicle velocity is shown in Japanese Laid-open Patent Application Publication No. SHO61-238523, dated Oct. 23, 1986. This down-shifting occurs because the operator manually accelerates the vehicle, and is irrespective of the resistance to vehicle movement.

A device for down-shifting the automatic transmission gear to decelerate the vehicle while the automatic speed control system is operating is shown in Japanese Laid-open Patent Application Publication No. SHO61-238531, dated Oct. 23, 1986. This down-shifting occurs to prevent increased velocity in combination with the closing of the throttle by the automatic throttle control system.

A device for down-shifting the automatic transmission gear when the throttle is at its maximum opening and the vehicle velocity is decreasing while the automatic speed control system is operating is shown in the Japanese Laid-open Patent Application Publication No. SHO60-1031, dated Jan. 7, 1985. This down-shifting occurs because of antihunting of the vehicle.

These devices are all intended to increase the comfort for vehicle occupants. However, when the automatic transmission control changes gears while the automatic speed control system is on, the speed stage may shift at the same time the automatic speed control starts. This can occur for example, when the switch for the automatic speed control is pushed. This may be uncomfortable, because the operator may not expect the gear change at the time the speed control is activated.

Further, if the automatic transmission becomes defective, a change of speed stage caused by movement of the throttle valve of the automatic speed control system may result in an unexpected and abrupt shift between speed stages, causing an unexpected shock to vehicle occupants.

When the automatic speed control system is controlling the vehicle velocity, both the avoidance of hunting and a relatively rapid return to the set vehicle velocity are necessary. Further, shocks resulting from shifts of the speed stage and operation of the throttle valve should be minimized.

SUMMARY OF THE INVENTION

It is an object of the present invention to maintain a comfortable ride for a vehicle having both an automatic transmission control system and an automatic speed control system.

It is a further object of the invention to decrease the delay time of the shift of the speed stage when the automatic speed control is activated to quickly reduce the present vehicle velocity to the set vehicle velocity.

It is a further object of the invention to establish an inhibition area for the shift of the speed stage when the automatic speed control is activated because of antihunting.

It is an another object of the invention to reduce the frequency of speed stage changes.

It is an another object of the invention to shift the speed stage of an automatic speed control according to the difference between the set vehicle velocity and the actual vehicle velocity.

It is still another object of the invention to inhibit undesired shifts of the speed stage of an automatic speed control system caused by movement of the throttle valve when the automatic transmission is subject to unexpected changes of gear.

It is another object of the invention to inhibit a concurrent shift of the speed stage at the time the automatic speed control system is activated.

Other and further objects of this invention will become obvious upon an understanding of the illustrative embodiment about to be described or will be indicated in the appended claims, and various advantages not referred to herein will occur to one skilled in the art upon practice of the invention.

BRIEF DESCRIPTION OF THE INVENTION

FIG. 14 is a flow chart showing a sub routine TEMPORARY TIMER SET for the CPU;

FIG. 15 is a flow chart showing a sub routine SOLENOID ABNORMAL DETECTING for the CPU;

FIG. 22 is a table showing the timer data;

FIG. 25 is a table showing a torque diagram which is stored in the CPU;

FIGS. 30 through 33 are tables showing shift diagrams and lockup diagrams which are stored in the CPU;

FIGS. 37 and 38 are tables showing variables, constants, timers and resistances of the CPU.

DESCRIPTION OF PREFERRED EMBODIMENT

Figure 1:
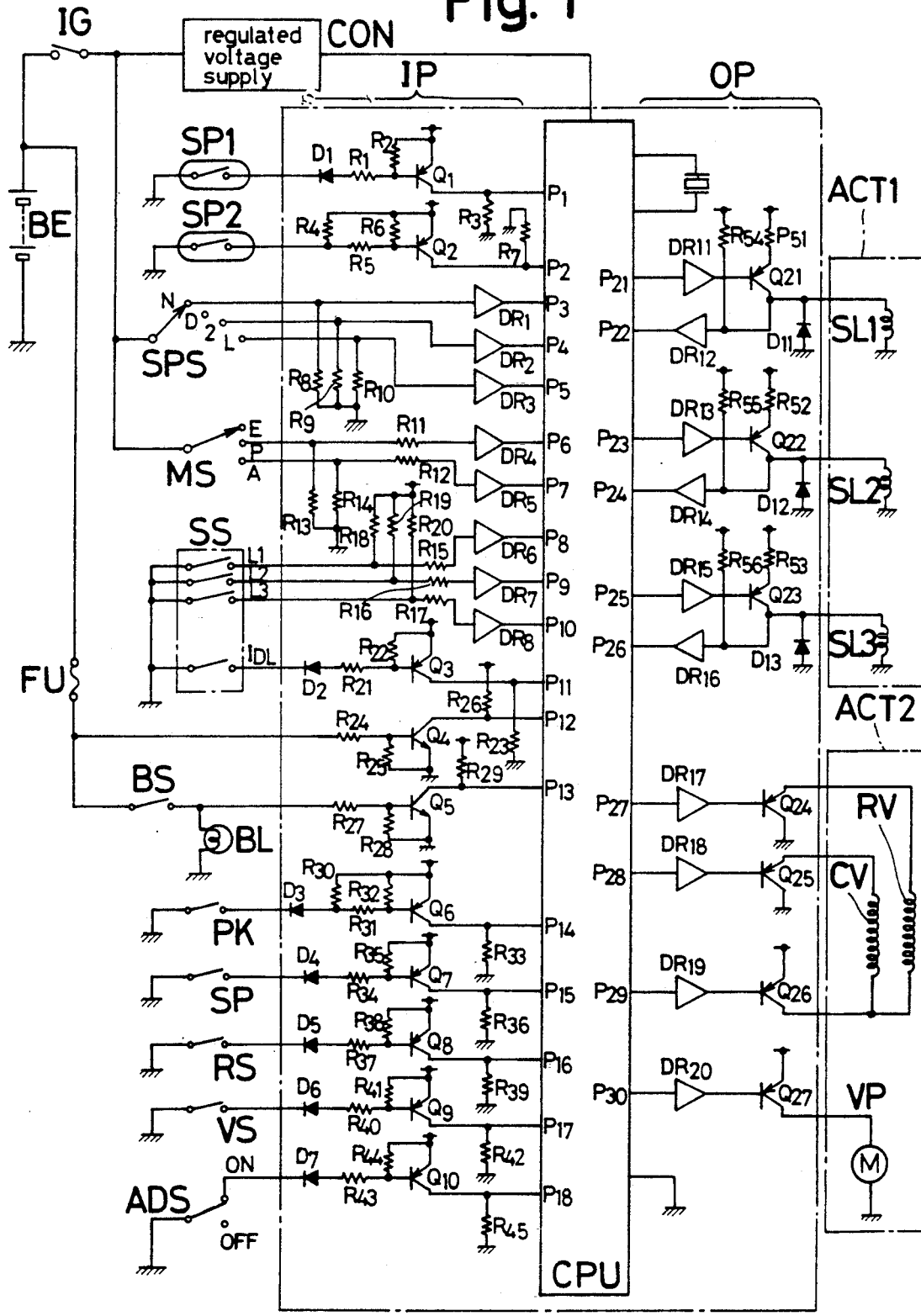
FIG. 1 is an circuit diagram showing the electric control system for controlling operation of an automatic speed control system and an automatic transmission control system according to one embodiment of the present invention.

Referring to FIG. 1, there is shown an electric circuit of a vehicle speed control system for a motor vehicle having an automatic transmission control system (an automatic transmission control means) and an automatic speed control system (an automatic speed control means or a throttle opening control means). In this embodiment, the electrical control device is mainly comprised of a microcomputer CPU. The CPU has a microprocessor unit MPU (not shown), a programmable timer PTM (not shown), input ports P1 through P18, output ports P21 through P30, a random access memory RAM (not shown) and a read only memory ROM (not shown). The MPU has two accumulators A and B (not shown) and an index register X (not shown). The MPU executes a program stored in the ROM.

A battery BE is connected to a regulated voltage supply CON via an ignition switch IG. The battery BE is a battery established in the motor vehicle generally. The regulated voltage supply CON regulates the voltage of the battery BE to 5 volts. The microcomputer CPU, an input interface circuit 1P and an output interface circuit OP are supplied with the 5 volts from the voltage supply CON.

This embodiment has two speed sensors. A speed sensor SP1 comprises a read switch for generating a frequency signal proportional to the rotational speed of a speedometer cable (not shown) by a permanent magnet (not shown) connected to the speedometer cable. The speed sensor SP1 is connected to the input port P1 of the CPU via an input interface comprising a diode D1, resistors R1, R2 and R3 and a transistor Q1. When the speed sensor SP1 is closed, the input port P1 changes to the "H" level. When the speed sensor SP1 is opened, the input port P1 changes to the "L" level.

A speed sensor SP2 comprises a reed switch for generating a frequency signal proportional to the rotational speed of an output shaft (not shown) of the automatic transmission by a permanent magnet (not shown) connected to the output shaft. The speed sensor SP2 is connected to the input port P2 of the CPU via an input interface comprising resistors R4, R5, R6 and R7, and a transistor Q2. When the speed sensor SP2 is closed, the input port P2 changes to the "H" level. When the speed sensor SP2 is opened, the input port P2 changes to the "L" level.

A shift position switch SPS for detecting the position of a shift lever (not shown) comprises a neutral range switch SPS-N, a drive range switch SPS-D, a second speed range SPS-2 and a low speed range switch SPS-L. When the shift lever is positioned at the neutral range, the switch SPS-N is turned ON, and the switches SPS-D, SPS-2 and SPS-L are turned OFF. When the shift lever is positioned at the drive range, the reverse range or the parking range, the switch SPS-D is turned ON, and the switches SPS-N, SPS-2 and SPS-L are turned OFF. When the shift lever is positioned at the second range, the switch SPS-2 is turned ON, and the switches SPS-N, SPS-D and SPS-L are turned OFF. When the shift lever is positioned at the low speed range, the switch SPS-N is turned ON, and the switches SPS-N, SPS-D and SPS-2 are turned OFF. The switches SPS-N, SPS-D, SPS-2 and SPS-L are connected to the input ports P3, P4, and P5 of CPU, respectively, via input interfaces comprising resistors R8, R9 and R10, and buffers DR1, DR2 and DR3. When the switches SPS-N, SPS-2 and SPS-L are turned ON, the ports P3, P4 and P5 are changed to the "H" level, respectively. When the switches SPS-N, SPS-2 and SPS-L are turned OFF, the input ports P3, P4 and P5 are changed to the "L", respectively.

A mode switch MS for setting the mode in the vehicle speed control to an economy mode, a power mode or an auto drive mode is comprised of an economy mode switch MS-E, a power mode switch MS-P and an auto drive mode switch MS-A. In the economy mode, the economy mode switch MS-E is turned ON, and the power mode switch MS-P and the auto drive mode switch MS-A are turned OFF. In the power mode, the power mode switch MS-P is turned ON, and the economy mode switch MS-E and the auto drive mode switch MS-A are turned OFF. In the auto drive mode, the auto drive mode switch MS-A is turned ON, and the economy mode switch MS-E and the power mode switch MS-P are turned OFF. The power mode switch MS-P and the auto drive mode switch MS-A are connected to the input ports P6 and P7 of the CPU, respectively, via input interfaces comprising resistors R11, R12, R13 and R14, and buffers DR4 and DR5. When the power mode switch MS-P is turned ON or OFF, the input port P6 is changed to the "H" level or the "L" level, respectively. When the auto drive mode switch MS-A is turned ON or OFF, the input port P7 is changed to the "H" lever or the "L" level, respectively.

A throttle opening sensor SS is for detecting the opening degree of the throttle valve (not shown) and comprises three contacts L1, L2 and L3 for dividing the throttle opening in to eight stages TH0 through TH7 and a contact IDL for detecting the engine idling condition. The relationship between the throttle opening TH0 through TH7 and and the states of contacts L1, L2 and L3 is as follows:

| THROTTLE OPENING | STAGES OF CONTACTS | | |
| --- | --- | --- | --- |
| | L1 | L2 | L3 |
| TH0 | OFF | OFF | OFF |
| TH1 | OFF | OFF | ON |
| TH2 | OFF | ON | ON |
| TH3 | OFF | ON | OFF |
| TH4 | ON | ON | OFF |
| TH5 | ON | ON | ON |

| THROTTLE | STAGES OF CONTACTS | | |
|---|---|---|---|
| OPENING | L1 | L2 | L3 |
| TH6 | ON | OFF | ON |
| TH7 | ON | OFF | OFF |

The contacts L1, L2 and L3 are connected to the input ports P8, P9 and P10 of the CPU, respectively, via input interfaces comprising resistors R15, R16, R17, R18, R19 and R20, and buffers DR6, DR7 and DR8. When the contacts L1, L2 and L3 are turned ON, the input ports P8, P9 and P10 are changed to the "L" level. When the contacts L1, L2 and L3 are turned OFF, the input ports P8, P9 and P10 are changed to the "H" level. The contact IDL is connected to the input port P11 of the CPU via an input interface comprising a diode D2, resistors R21, R22 and R23, and transistor Q3. When the contact IDL is turned ON, the input port P11 is changed to the "H" level. When the contact IDL is turned OFF, the input P11 is changed to "L" level.

A brake lamp BL is connected to the battery BE via a brake switch BS and a fuse FU. A line between fuse FU and the brake switch BS is connected to the input port P12 of the CPU via an input interface comprising resistors R24, R25 and R26, and a transistor Q4. When the fuse FU electrically connects between the battery BE and the brake switch BS, the input port P12 is changed to the "L" level. When the fuse FU melts, the input port P12 is changed to the "H" level. A line between the brake switch BS and the brake lamp BL is connected to the input port P13 of the CPU via an input interface comprising resistors R27, R28 and R29, and a transistor Q5. When the fuse FU is normal and the brake switch BS is turned ON, the input port P13 is changed to "L" level. When the fuse FU melts or the brake switch BS is turned OFF, the input port P13 is changed to "H" level.

A parking brake switch PK is turned ON when a parking brake (not shown) is operated. A set switch SP and resume switch RS for the vehicle speed control system are each comprised of a push button type switch wherein the switch is turned ON when the switch is pushed and is turned OFF when the switch is not pushed. A vacuum switch VS is for detecting vacuum in a surge tank (not shown). Such vacuum is required to operate the vehicle speed control system. The vacuum switch VS is turned ON when the vacuum pressure is higher than a preset value (In this case the vacuum pressure approaches atmospheric pressure). The parking brake switch PK, the set switch SP, the resume switch RS and the vacuum switch VS are connected to the input ports P14, P15, P16 and P17 of the CPU, respectively, via input interfaces comprising diodes D3, D4, D5 and D6, resistors R31, R34, R37 and R40, and transistors Q6, Q7, Q8 and Q9. When each of switches PK, SP, RS and VS is tuned ON, the input ports P14, P15, P16 and P17 are changed to the "H" level, respectively. When each of switches PK, SP, RS and VS is turned OFF, the input ports P14, P15, P16 and P17 are changed to the "L" level.

A main switch ADS for the vehicle speed control has an ON contact and an OFF contact. The ON contact is connected to the input port P18 of the CPU via an input interface comprising a diode D7, a resistor R43 and a transistor Q10. When the main switch is turned ON, the input port P18 is changed to the "H" level. When the main switch is turned OFF, the input port P18 is changed to the "L" level.

An actuator ACT1 for the automatic transmission comprises shift solenoids SL1 and SL2 and lockup solenoid SL3. The chift solenoids are for shifting of automatic transmission gearing. The relationship between the shift solenoids SL1 and SL2 with respect to the times they are electrically energized and electrically deenergized and the condition of the automatic transmission gearing are as follows:

| SHIFT SOLE- | SPEED STAGES | | | |
|---|---|---|---|---|
| NOIDS | 1st speed | 2nd speed | 3rd speed | O/D speed |
| SL1 | Energized | Energized | Deenergized | Deenergized |
| SL2 | Deenergized | Energized | Energized | Deenergized |

The lockup solenoid SL3 is for controlling a lockup clutch (not shown) for accomplishing direct engagement an output shaft of an engine (not shown) with an input shaft of a torque converter (not shown). When the lockup solenoid SL3 is energized, the lockup clutch is engaged and therefore the lockup operation is accomplished. When the lockup solenoid SL3 is deenergized, the lockup clutch is disengaged and therefore the lockup operation is released. The solenoids SL1, SL2 and SL3 are operated in accordance with the condition of the output ports P21, P23 and P25 of the CPU respectively. A buffer DR11, a transistor Q21 and a diode D11 comprise an output interface for the shift solenoid SL1. When the output port P21 is changed to the "H" level, the solenoid SL1 is deenergized. When the output port P21 is changed to the "L" level, the solenoid SL1 is energized. A buffer DR12 and resistors R51 and R54 comprise a fail detecting circuit for the solenoid SL1. The solenoid SL1 is connected to the input port P22 via the fail detecting circuit. When the wire of the solenoid or the wire between the output interface and the solenoid is cut or broken, the input port P22 is changed to the "H" level. When the wire between the output interface and the solenoid SL1 is short-circuited to ground, the port P22 is changed to the "L" level. A buffer DR13, a transistor Q22 and a diode D12 comprise an output interface of the solenoid SL2. A buffer DR13 and resisters R52 and R55 comprise a fail detecting circuit for the solenoid SL2. A buffer DR15, a transistor Q23 and a diode D13 comprise an output interface for the solenoid SL3. A buffer DR16 and resistors R53 and R56 comprise a fail detecting circuit for the solenoid SL3. When the output port P23 is changed to the "H" level, the solenoid SL2 is deenergized. When the output port P23 is changed to the "L" level, the solenoid SL2 is energized. When the wire of the solenoid SL2 or the wire between the output interface of the solenoid SL2 and the solenoid SL2 is cut or broken, the input port P24 is changed to the "H" level. When the wire between the output interface of the solenoid SL2 and the solenoid SL2 is short-circuited to ground, the port P24 is changed to the "L" level. When the output port P25 is changed to the "H" level, the solenoid SL3 is deenergized. When the output port P25 is changed to the "L" level, the solenoid SL3 is energized. When the wire of the solenoid SL3 or the wire between the output interface of the solenoid SL3 and the solenoid SL3 is cut or broken, the input port P26 is changed to the "H" level. When the wire between the output interface of the solenoid SL3 and the solenoid SL3 is short-circuited to ground, the port P26 is changed to the "L" level.

An actuator ACT2 for the vehicle speed control comprises a release valve RV, a control valve CV, a vacuum pump VP, the surge tank (not shown) and a vacuum actuator (not shown). The vacuum pump VP operates as a vacuum source. The vacuum pump VP comprises a motor M. When the motor M rotates, a vacuum is generated. The vacuum generated by the vacuum pump VP is stored in the surge tank. The surge tank is connected to the vacuum actuator via release valve RV and control valve CV. The control valve CV communicates between the surge tank and the release valve RV when the control valve CV is energized. On the other hand, the control valve CV disconnects from the surge tank to release the vacuum to atmosphere via the release valve RV when the control valve CV is deenergized. The release valve RV communicates between the control valve CV and the vacuum actuator when the release valve RV is energized. On the other hand, the release valve RV releases atmosphere to the vacuum actuator when the release valve RV is deenergized. The control valve CV and the release valve RV operate in accordance with the condition of the output ports P27, P28 and P29 of the CPU. One end of the release valve RV is connected to the output port P27 via an output interface comprising a buffer DR17 and a transistor Q24. One end of the control valve CV is connected to the output port P28 via an output interface comprising a buffer DR18 and a transistor Q25. The other end of the release valve RV and the control valve CV is connected to the output port P29 via an output interface comprising a buffer DR19 and a transistor Q26. When the output ports P27 and P29 are changed to the "L" level at the same time, the release valve RV is energized. When the output ports P28 and P29 are changed to the "L" level at the same time, the control valve CV is energized. However, when the output port P27 is changed to the "H" level, the release valve RV is deenergized. When the output port P28 is changed to the "H" level, the control valve is deenergized. When the output port P29 is changed to the "H" level, the release valve RV and the control valve CV are deenergized together. The motor M of the vacuum pump VP is energized by the condition of the output port P30 of the CPU. The output port P30 is connected to the motor M via an output interface comprising a buffer DR20 and a transistor Q27. When the output port P30 is changed to the "L" level, the motor M is rotated, and when the output port P30 is changed to the "H" level, the motor M is not rotated.

Figure 34:
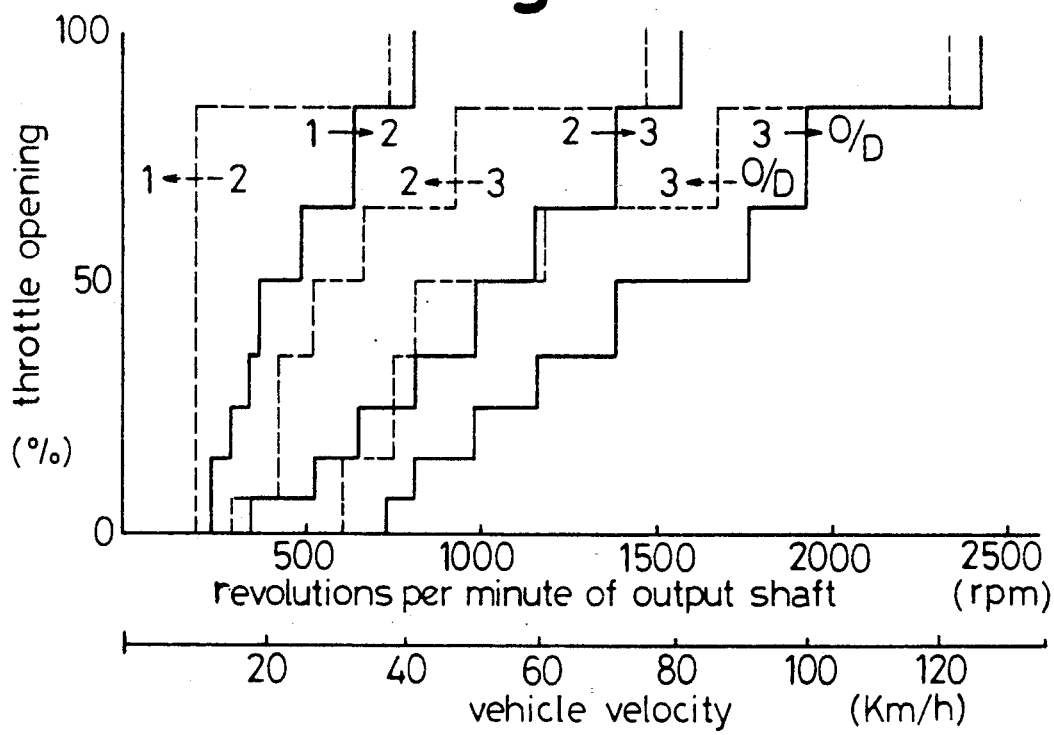
FIG. 34 is a graph showing the operation of the automatic transmission control system.

Stored in the read only memory ROM of the microcomputer CPU are ECT shift data, ECT lockup data, ECT-A/D shift data, ECT-A/D lockup data, ECT up timer data, ECT down timer data, ECT-A/D up timer data, ECT-A/D down timer data, torque data, maximum torque data, and instructions for the vehicle speed control system. The ECT shift date are data of an ECT shift diagram as shown in FIG. 31 for shifting the speed stage of the automatic transmission when the automatic speed control system is not operating. The ECT-A/D shift data are data of an ECT-A/D shift diagram as shown in FIG. 32 for shifting the speed stage of the automatic transmission when the automatic speed control is operating. The ECT lockup data are data of an ECT lockup diagram as shown in FIG. 31 for operating the lockup clutch of the automatic transmission when the automatic speed control system is not operating. The ECT-A/D lockup data are data of an ECT-A/D lockup diagram as shown in FIG. 33 for operating the lockup clutch of the automatic transmission when the automatic speed control system is operating. For example, a map for shifting the speed stage as shown in FIG. 34 is set in the read only memory ROM as the ECT shift diagram. The ECT up timer data and the ECT-A/D up timer data are data for prohibition and delay of the up shift of the speed stage when the automatic speed control system is not operating and is operating, respectively. The ECT down timer data and the ECT-A/D down timer data are data for prohibition and delay of the down shift of the speed stage when the automatic speed control system is not operating and is operating, respectively. The torque data are data of torque diagrams as shown in FIG. 25 for calculating the torque of the vehicle. The maximum torque data are data of a maximum torque diagram as shown in FIG. 26 for calculating the maximum torque of the vehicle. The instructions for the vehicle speed control system are shown as flow diagrams in FIG. 2 through FIG. 19. Variables, registers, timers, flags and constants used in the flow diagrams are shown in FIG. 37 and FIG. 38.

Figure 2:
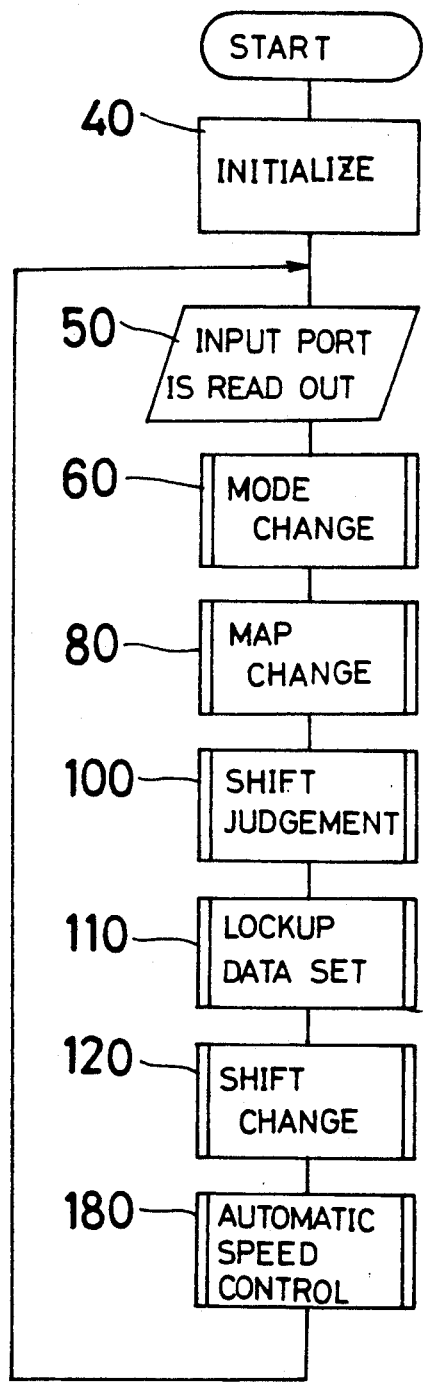
FIG. 2 is a flow chart showing a main routine for the microcomputer CPU in FIG. 1.

When the ignition switch IG is turned ON and the regulated voltage supply CON begins to supply the voltage to the CPU, the operation of CPU is started. Referring to FIG. 2, in step 40, the condition of memories and ports is initialized. In this step, memories are cleared, ports P1 through P18, P22, P24 and P26 are set as input ports, ports P21, P23, P25 and P27 through P30 are set as output ports, and flags are set to the initial level thereof.

The condition of each input port is read out and flags or memories are set as follows (step 50):

Flag SW-D is set to "1" when the shift lever is positioned at the drive range, the reverse range or the parking range, and set to "0" when the shift lever is positioned at the neutral range, the second speed range or the low speed range.

Flag SW-BK is set to "1" when the brake switch BS is turned ON, and set to "0" when the brake switch BS is turned OFF.

Flag SW-PKB is set to "1" when the parking brake switch PK is turned ON, and set to "0" when the parking brake switch PK is turned OFF.

Flag SW-A/D-MAIN is set to "1" when the main switch ADS is turned ON, and set to "0" when the main switch ADS is turned OFF.

Flag SW-A/D-SET is set to "1" when the set switch SP is turned ON, and set to "0" when the set switch SP is turned OFF.

Flag SW-A/D-RES is set to "1" when the resume switch RS is turned ON, and set to "0" when the resume switch RS is turned OFF.

After step 50, a sub routine MODE CHANGE (step 60), a sub routine MAP CHANGE (step 80), a sub routine SHIFT JUDGEMENT (step 100), a sub routine LOCKUP DATA SET (step 110), a sub routine SHIFT CONTROL (step 120) and a sub routine AUTOMATIC SPEED CONTROL (step 180) are executed continuously, and step 50 is executed again after these are completed.

Figure 3:
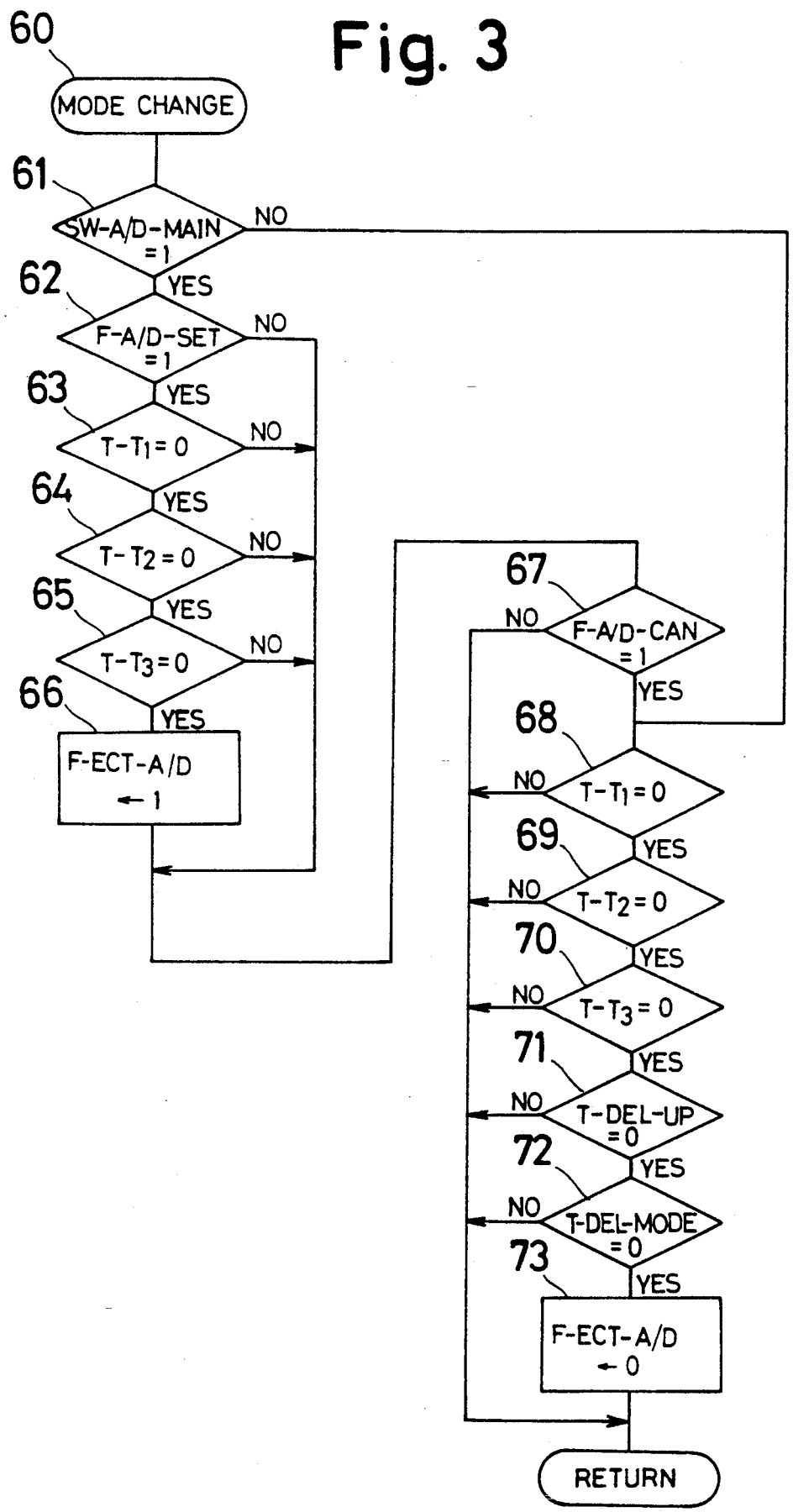
FIG. 3 is a flow chart showing a sub routine MODE CHANGE for the CPU.

The sub routine MODE CHANGE (step 60) as shown in FIG. 3 is executed for changing to ECT mode or ECT-A/D mode. The ECT mode is for actuating the automatic transmission control system only, and the ECT-A/D mode is for actuating both the automatic transmission control system and the automatic speed control system. When Flag SW-A/D-MAIN is "1", and Flag F-A/D-SET is "1", and timers T-T1, T-T2 and T-T3 are all "0", Flag F-ECT-A/D is set to "1" (step 61 through step 66), thereby changing the mode of the vehicle speed control system to ECT-A/D MODE. When Flag SW-A/D-MAIN is "0", and when Flag SW-A/D-MAIN is "1" and Flag F-A/D-CAN is "1", or when Flag SW-A/D-MAIN is "0", if timers T-T1, T-T2, T-T3, T-DEL-UP and T-DEL-MODE are all "0", then Flag F-ECT-A/D is set to "0" (step 61 and 68 through 73). Timers T-T1, T-T2 and T-T3, which are described later, are for shift of the speed stage. When these timers are not "0", the transmission is executing the shift of the speed stage. Timer T-DEL-UP is for delaying the up shift of the speed stage as described below. When timer T-DEL-UP is not "0", the up shift is not executed. Timer T-DEL-MODE is for delaying the mode changing. When timer T-DEL-MODE is not "0", the mode change is not executed. In this way, the mode of the vehicle speed control system is changed to ECT-A/D mode (flag F-ECT-A/D is set to "1") when the main switch ADS is turned ON, and further, the set switch is turned ON, and the mode of the vehicle speed control system is changed to ECT mode (flag F-ECT-A/D is set to "0") when the main switch ADS is turned OFF or the Flag F-A/D-CAN is set to "1". In this time, Flag F-ECT-A/D is set to "0" when the transmission is shifting (timers T-T1, T-T2 and T-T3 are not "0") or up shift is delayed (T-DEL-UP is not "0") or the mode change is delayed (T-DEL-MODE is not "0").

Figure 4:
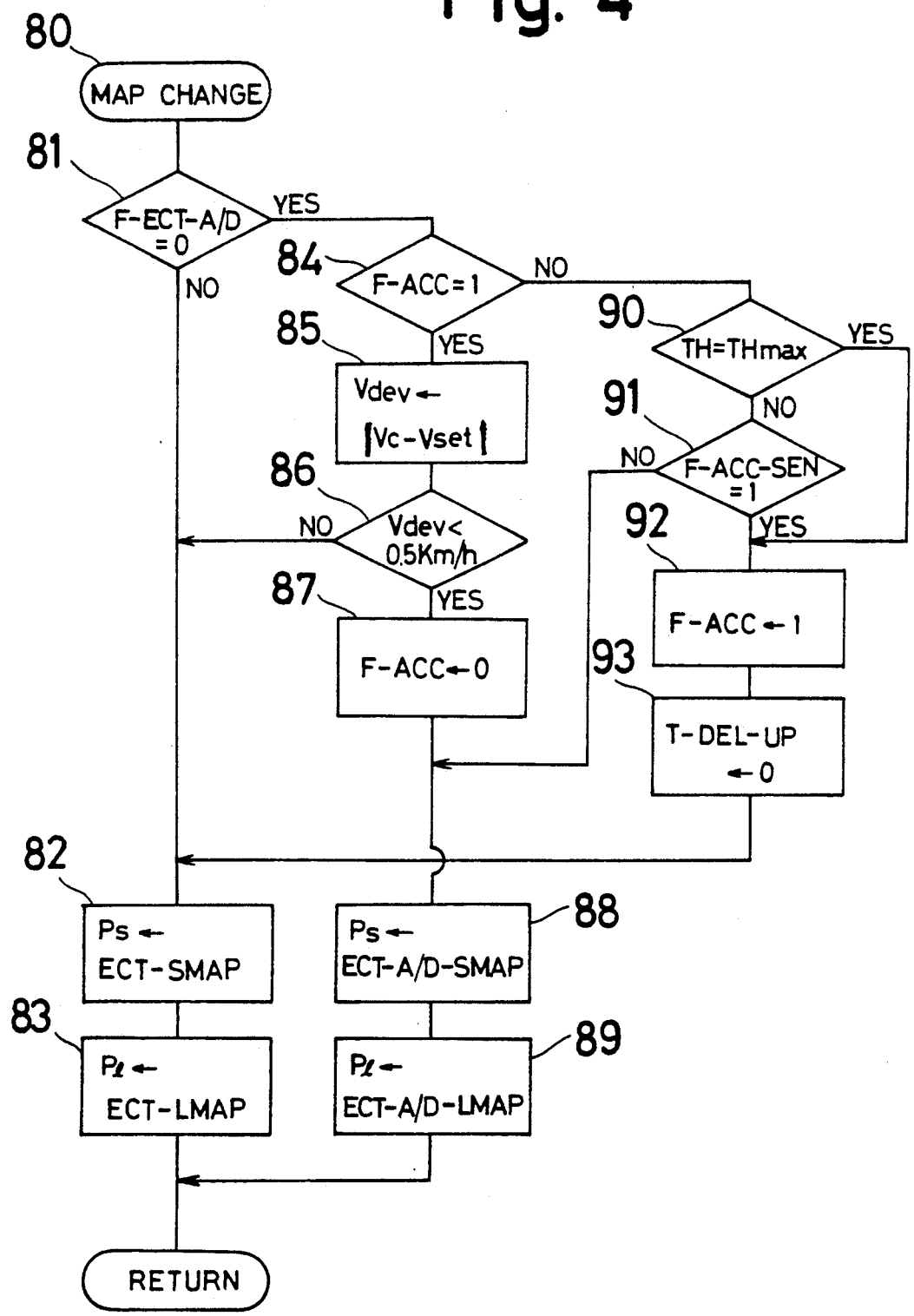
FIG. 4 is a flow chart showing a sub routine MAP CHANGE for the CPU.

The sub routine MAP CHANGE as shown in FIG. 4 is executed after sub routine MODE CHANGE. When flag F-ECT-A/D is "1" (step 81), or when flag F-ECT-A/D is "0" and flag F-ACC is "1" and variable Vdev is not lower than 0.5 kilometer per hour (step 81 and step 84, 85 and 86), a constant ECT-SMAP is set to an address pointer Ps of the shift data and a constant ECT-LMAP is set to an address pointer Pl of the lockup data (step 82 and 83). When flag F-ECT-A/D is "0" and flag F-ACC is "0" and variable TH is equal to constant THmax (step 81, 84 and 90), or when flag F-ECT-A/D is "0" and flag F-ACC is "0" and variable TH is equal to constant THmax and flag F-ACC-SEN is "1" (step 81, 84, 90 and 91), a constant ECT-SMAP is set to an address pointer Ps of the shift data and a constant ECT-LMAP is set to an address pointer Pl of the lockup data (step 82 and 83) after flag F-ACC is set to "1" and timer T-DEL-UP is set to "0" (step 92 and 93). Variable Vdev is calculated in step 85 as the absolute value of the deviation between a present vehicle velocity Vc and the setting vehicle velocity Vset. The present vehicle velocity Vc is calculated by signals from the speed sensor SP1 and the speed sensor SP2. The setting vehicle velocity Vset is the vehicle velocity at the time which the set switch SP is turned OFF. Variable TH is the present throttle opening. Constant THmax is the maximum throttle opening, and the value of the THmax is "TH7". Thus, step 90 is a judgement step to determine whether the present throttle opening is "TH7". Flag F-ACC-SEN is set to "1" at timer interrupt, which is described below, when the amount of the throttle opening is large. Flag F-ACC is set to "1" if the present throttle opening is "TH7" or if the throttle opening is rapidly increased when the acceleration is not stepped at ECT-A/D mode. Flag F-ACC is set to "0" if the deviation between the present vehicle velocity Vc and the setting vehicle velocity Vset is smaller than 0.5 kilometer per hour when the acceleration is stepped at ECT-A/D mode. In this way, the value of the head address of ECT shift data (ECT-SMAP) is set to the address pointer Ps, and the value of the head address of ECT lockup data (ECT-LMAP) is set to the address pointer Pl at the ECT mode, at the time that the deviation Vdev is large but the accelerator is stepped at ECT-A/D mode, and at the time that the throttle opening is a maximum or moves quickly when the accelerator is not stepped at ECT-A/D mode. Therefore ECT shift and lockup data are used for shift and lockup judgment in this case.

When flag F-ECT-A/D is "0", flag F-ACC is "0", variable TH is not equal to variable THmax and flag F-ACC-SEN is "0" (step 81, 84, 90 and 91), a constant ECT-A/D-SMAP is set to the address pointer Ps and a constant ECT-A/D-LAMP is set to the address pointer Pl (step 88 and 89). When flag F-ECT-A/D is "0", flag F-ACC is "1" and variable Vdev is lower than 0.5 kilometer per hour (step 81, 84, 85 and 86), a constant ECT-A/D-SMAP is set to the address pointer Ps and a constant ECT-A/D-LMAP is set to the address pointer Pl (step 88 and 89) after flag F-ACC is set to "0" (step 87). In this way, the value of the head address of the ECT-A/D shift data (ECT-A/D-SMAP) is set to the address pointer Ps, and the value of the head address of the ECT-A/D lockup data (ECT-A/D-LMAP) is set to the address pointer Pl at the ECT-A/D mode, except when the deviation Vdev is large, but the accelerator is stepped, and the time that the throttle opening is a maximum or moves quickly when the accelerator is not stepped. Therefore the ECT-A/D shift and lockup data are used for shift and lockup judgment in this case.

Figure 19:
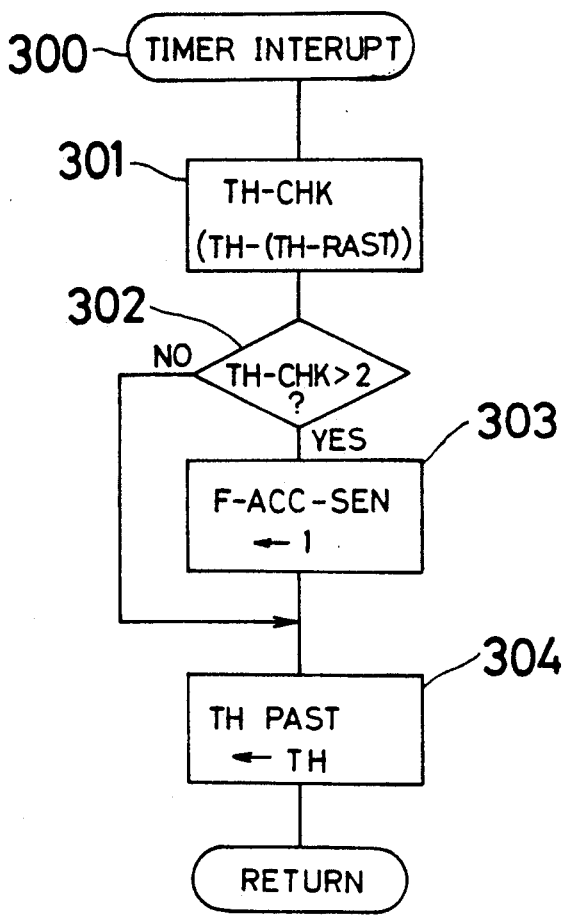
FIG. 19 is a flow chart showing a sub routine TIMER INTERRUPT for the CPU.

The timer interrupt is shown in FIG. 19. The timer interrupt is executed one time per 200 milliseconds. Referring to FIG. 19, variable TH-CHK is set to the absolute value of the value by subtracting the value of variable TH-PAST from variable TH. The variable TH-PAST shows the value of the throttle opening before 200 milliseconds. In step 302, if the variable TH-CHK is larger than two, then flag F-ACC-SEN is set to "1". Thus, when the throttle opening is moved over two for 200 milliseconds, flag F-ACC-SEN is set to "1". In step 304, variable TH-PAST is replaced with the variable TH for next timer interrupt.

Figure 5:
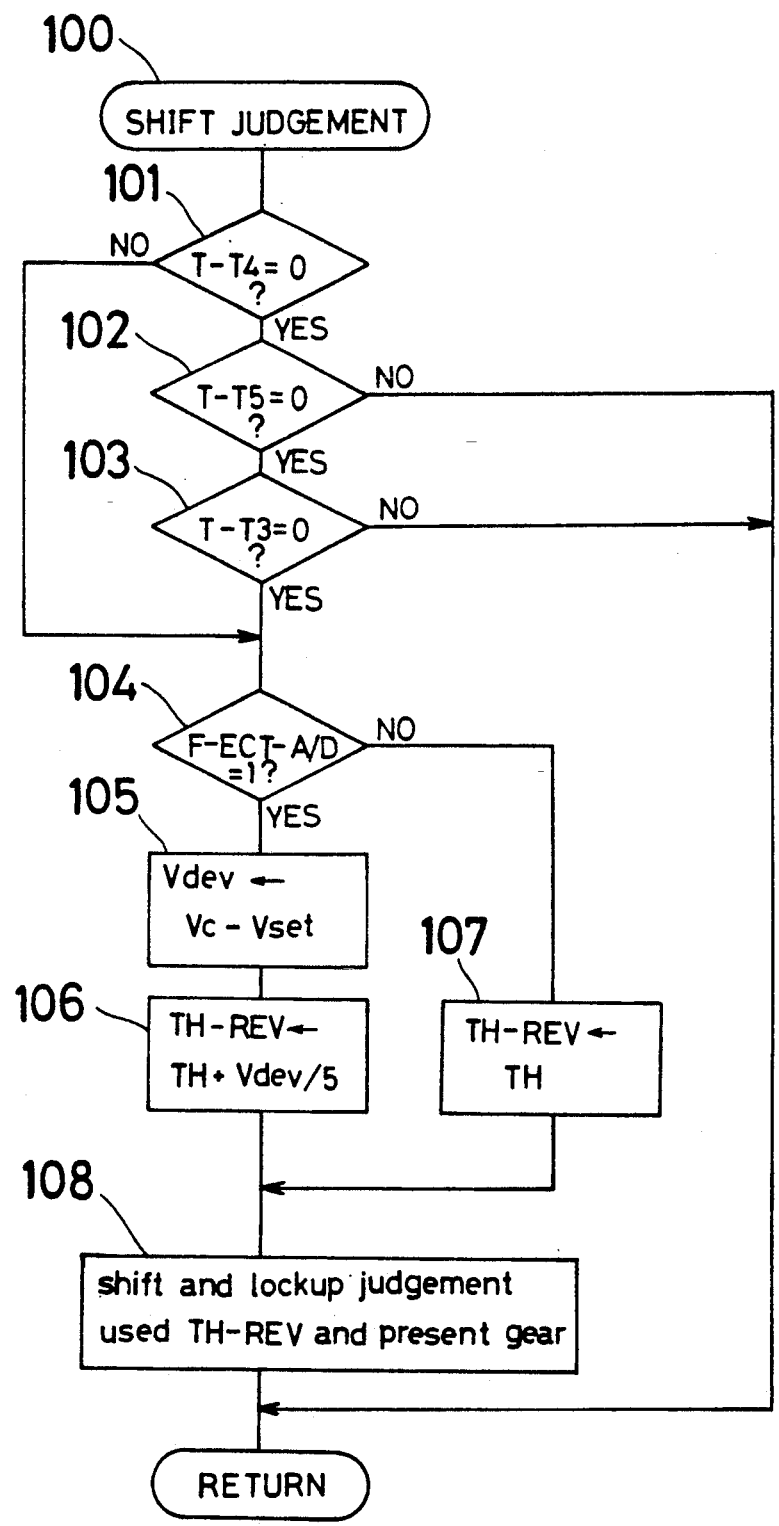
FIG. 5 is a flow chart showing a sub routine SHIFT JUDGEMENT for the CPU.

The sub routine SHIFT JUDGMENT as shown in FIG. 5 is executed after sub routine MAP CHANGE. When timer T-T4 is not "0" or when timer T-T5 is "0" and timer T-T3 is "0" (step 101, 102 and 103), a value of variable TH-REV is set in steps 104 through 107 and shift and lockup judgment is executed using the variable TH-REV, the present speed stage and the data indicated by the address pointers Ps and Pl. Here, when the fixed duty control (described later) is executing, the shift and lockup judgment is not executed. The fixed duty control controls the throttle valve, so the throttle opening is changed, and the speed stage of the automatic transmission control system is shifted by the change of the throttle opening. This routine prohibits a new shift at the fixed duty rate control for decreasing the shock of the shift of the speed stage. In the shift and lockup judgment (step 108), if the created speed stage is lower than the last speed stage, then flag F-DWN is set to "1", and if the created speed stage is higher than the last speed stage, then flag F-DWN is set to "0". The variable TH-REV is set to TH+Vdev/5 at the ECT-A/D mode (flag F-ECT-A/D is "1"). The variation Vdev is a value Vc-Vset, wherein Vc is the present vehicle velocity and Vset is the setting Vehicle velocity. The variable TH-REV is set to TH at the ECT mode (flag F-ECT-A/D is "0"). In this way, at the ECT-A D mode, the shift and lockup judgment is executed taking the deviation Vdev into consideration. The variable amount of the shifting point and lockup point varies according to the magnitude of the deviation Vdev. If the deviation Vdev is positive, the down shifting is easier because the shift data is set so that the vehicle velocity at the shifting point is higher according to the increase of throttle opening. If the deviation Vdev is negative, the up shifting is easier because the shift data is set so that the vehicle velocity at shifting point is lower according to the decrease of throttle opening. When the vehicle is driven by the automatic speed control system, if the present vehicle velocity is smaller than the setting vehicle velocity, the vehicle is apt to raise the vehicle velocity because of easiness of down shift. When the vehicle is driven by the automatic speed control system, if present vehicle velocity is larger than the setting vehicle velocity, the vehicle is apt to reduce the vehicle velocity because of easiness of up shift.

Here, timer T-T3 (described later) indicates the time until the engaging of the lockup clutch is allowed from when the shift of the speed stage is completed. Timer T-T4 (described later) indicates the time until the start of the fixing duty rate control of the throttle valve. Timer T-T5 (described later) indicates the time until the end of the fixing duty rate control of the throttle valve from the start of the fixing duty rate control. Accordingly, in steps 101, 102 and 103, the shift and lockup judgment is not executed in the time from the shift to the end of the disengaging of the lockup clutch and in the time that the fixing duty rate control is executed.

Figure 6:
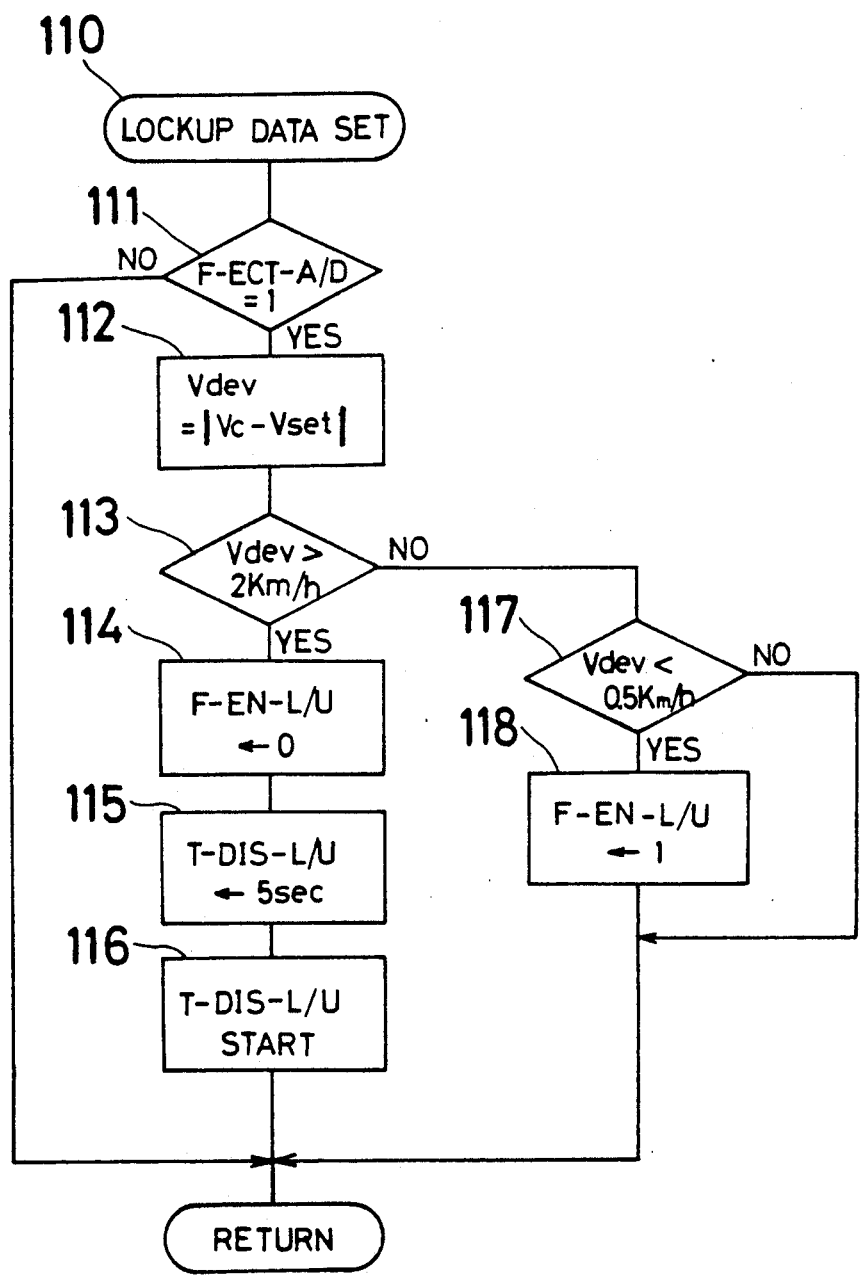
FIG. 6 is a flow chart showing a sub routine LOCKUP DATA SET for the CPU.

The sub routine LOCKUP DATA SET, as shown in FIG. 6, is executed after sub routine SHIFT JUDGMENT. The deviation Vdev is set to the absolute value of the difference between the present vehicle velocity Vc and the setting vehicle velocity (step 112). When the deviation Vdev is larger than 2 kilometers per hour (step 113), flag F-EN-L/U is set to "0" (step 114), timer T-DIS-L/U is set to 5 seconds (step 115) and timer T-DIS-L/U is started (step 116). The timer T-DIS-L/U is decreased 1 bit according to a predetermined time, and becomes "0" after 5 seconds. When the deviation Vdev is smaller than 0.5 kilometers per hour (steps 113 and 117), flag F-EN-L/U is set to "1" (step 118). Flag F-EN-L/U is a lockup allowance flag. If the flag F-EN-L/U is "1", then the engaging of the lockup clutch is enablod, and if the flag F-EN-L/U is "0" than the engaging of the lockup clutch is not enabled during sub routine SHIFT CHANGE, described later. These operations are not executed if flag F-ECT-A/T is "0" (ECT mode).

Figure 7:
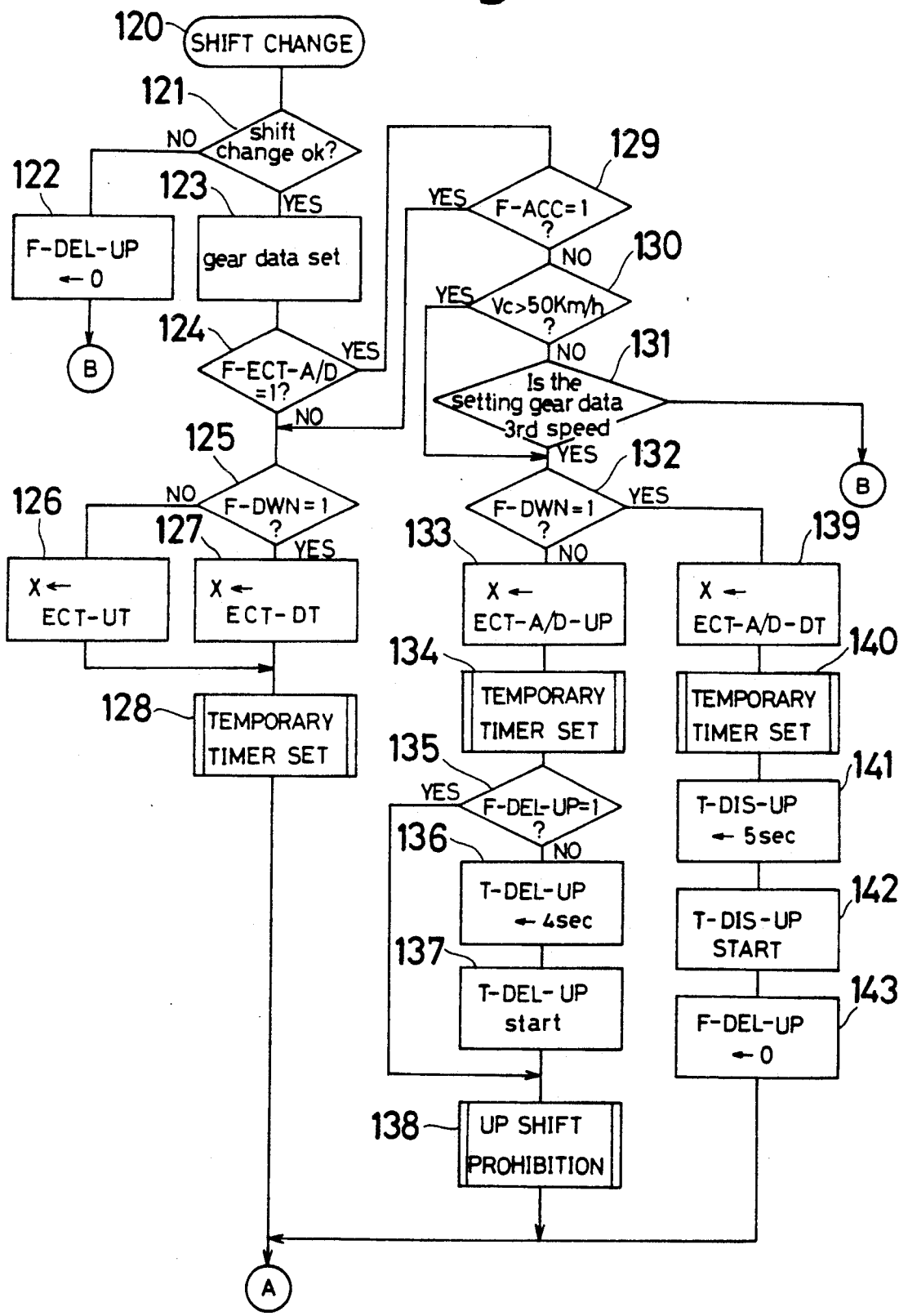
FIGS. 7 through 9 are flow charts showing a sub routine SHIFT CHANGE for the CPU.
Figure 8:
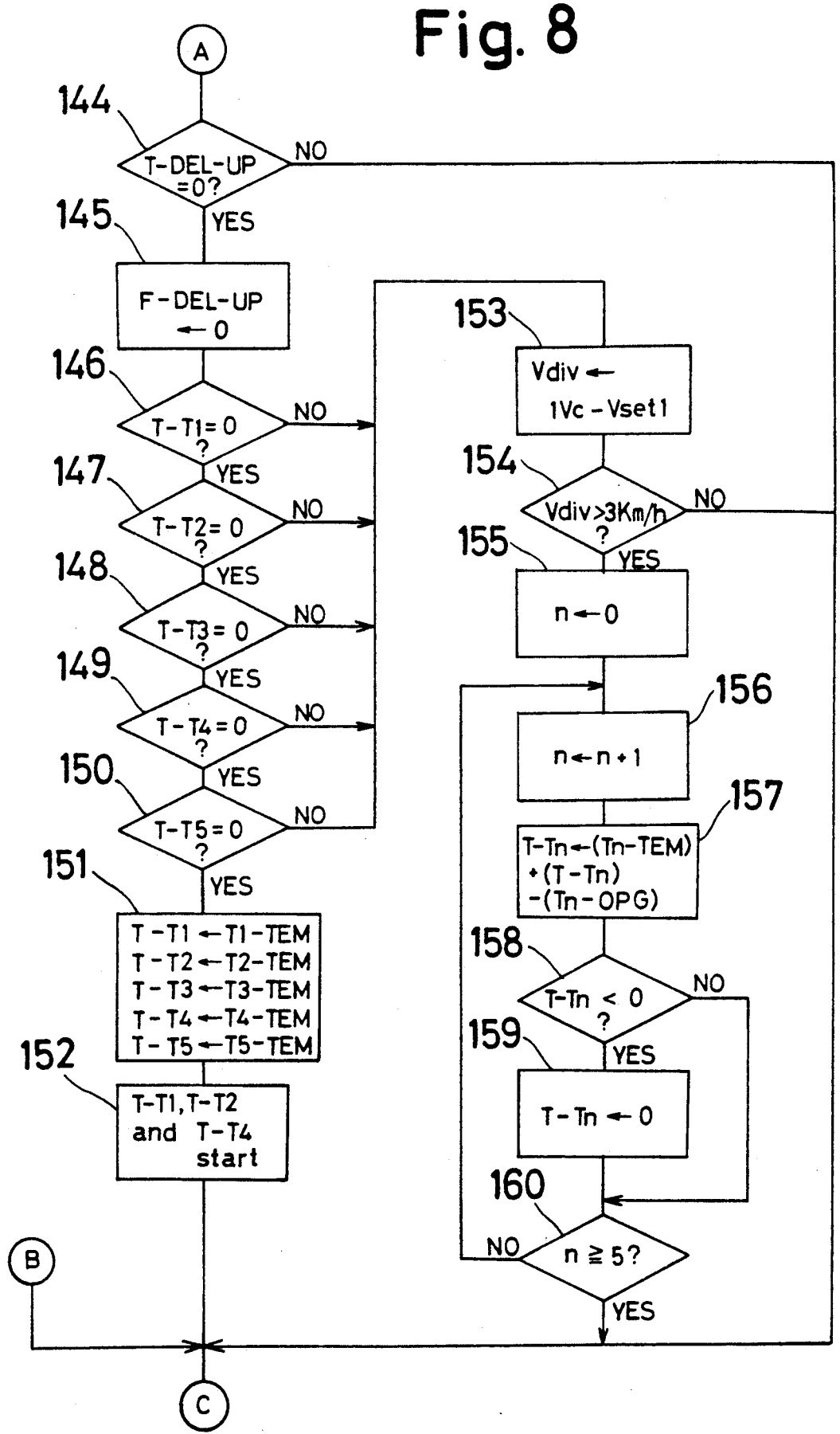
Figure 9:
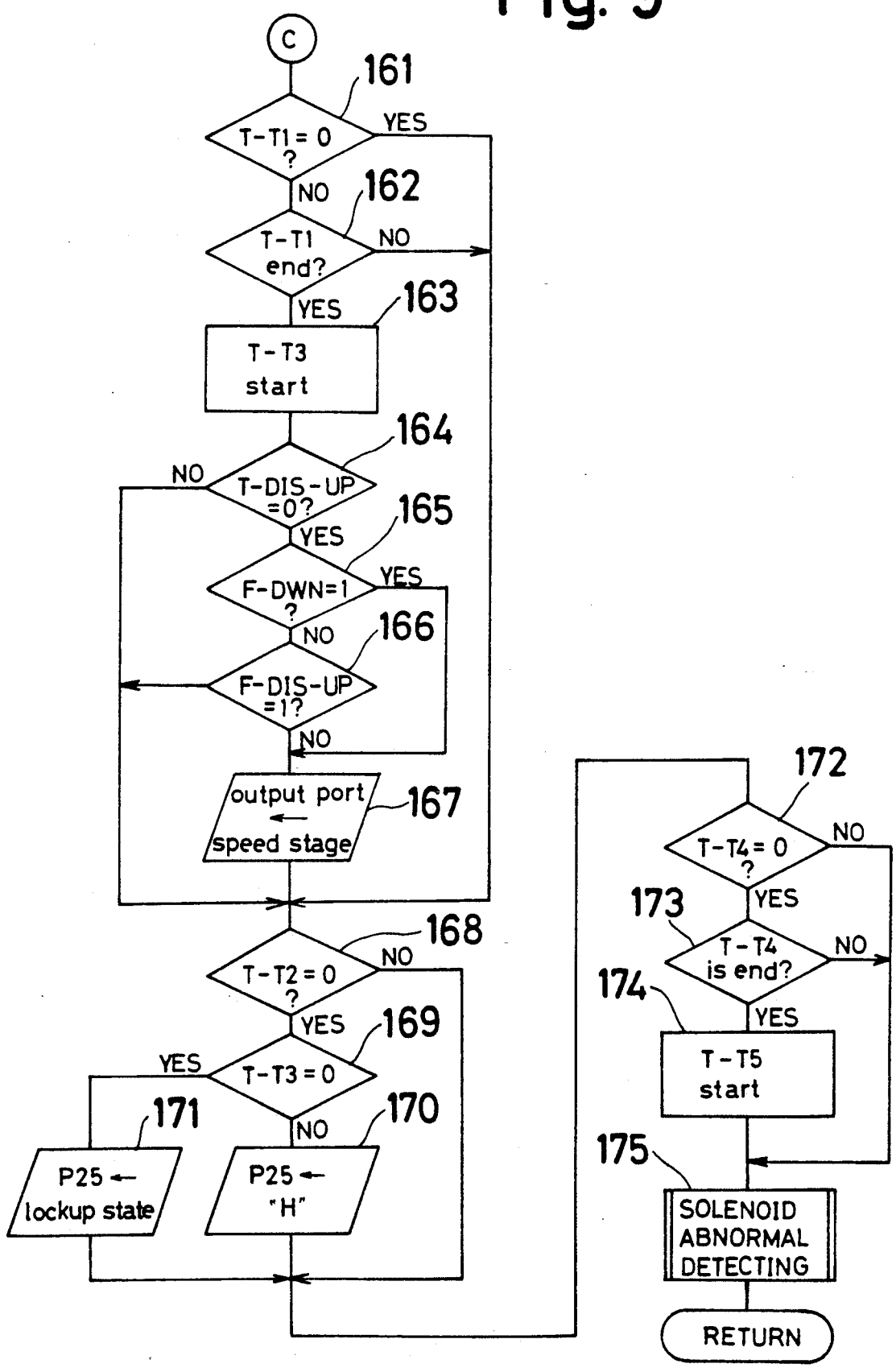

The sub routine SHIFT CHANGE, as shown in FIGS. 7, 8 and 9, is executed after the sub routine LOCKUP DATA SET. When the shift of the speed stage is not occurring, flag F-DEL-UP, which indicates that the delay of up shift is occurring, is set to "0" and steps 161 through 170 are executed. When the shift of the speed stage is detected by the shift and lockup judgment of step 108 in FIG. 5, the speed stage is set to the RAM (step 123) and timers for shifting of the speed stage are established in the following step. When flag F-ECT-A/D is "0" (the mode is ECT mode) or flag F-ACC is "1" (the operation of the accelerator is occurring), if the shift of the speed stage is to a lower stage (flag F-DWN is "1"), then index register X is set to a constant ECT-DT, and if the shift of the speed stage is up shift (flag F-DWN is "0") then index register X is set to a constant ECT-UT at steps 125 through 127. The constant ECT-DT is a head address of the ECT down timer, and the timer data at the time that the shift of the speed stage is to lower stage are set in the contents of the addresses indicated by the values of ECT-DT to ECT-DT+4. The constant ECT-UT is a head address of the ECT down timer, and the timer data at the time that the shift of the speed stage is to higher stage are set in the contents of the addresses indicated by the values of ECT-UT to ECT-UT+4. After these steps, sub routine TEMPORARY TIMER SET is executed.

The sub routine TEMPORARY TIMER SET, as shown in FIG. 14, is for setting timers for shift of the speed stage. Referring to FIG. 14, variables T1-ORG, T2-ORG, T3-ORG, T4-ORG and T5-TRG are set to the value of variables T1-TEM, T2-TEM, T3-TEM, T4-TEM, T3-TEM, T4-TEM and T5-TEM, respectively. Variables T1-TEM, T2-TEM, T3-TEM, T4-TEM and T5-TEM are set to the contents of addresses X, X+1, X+2, X+3, X+4 and X+5, respectively. X is a value of the index register. The variables T1-ORG through T5-ORG are the old values of the timers T-T1 through T-T5, and the variables T1-TEM through T5-TEM are the temporary values of the timers T-T1 through T-T5. For example, in step 128 in FIG. 7, if the shift of the speed stage is to a lower stage, the variables T1-TEM, T2-TEM, T3-TEM, T4-TEM and T5-TEM are set to the contents of the addresses indicated by the values of ECT-DT, ECT-DT+1, ECT-DT+2, ECT-DT+3 and ECT-DT+4. In this way, the temporary timers are set. However, the timers are able to change according to the throttle opening, desired speed stage and the state of the lockup clutch, as shown if FIG. 22.

Figure 36:
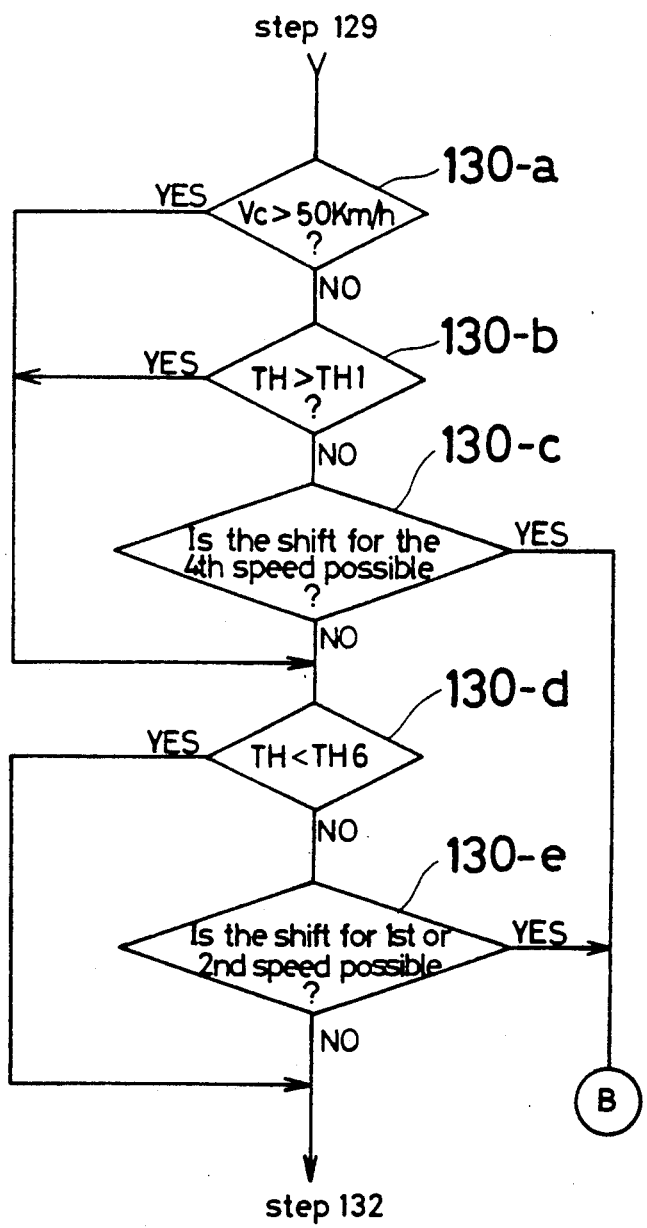
FIG. 36 is a fragmentary flow chart showing a modified form of that sub routine SHIFT CHANGE shown in FIG. 7.

Referring to FIGS. 7 through 9 again, when the mode is ECT-A/D mode (flag F-ECT-A/D) is "1") and the acceleration is not operated (flag F-ACC is "0"), steps 132 through 143 are executed except for the case when the present vehicle velocity is lower than 50 kilometers and the setting speed stage in step 123 is 3rd speed. When the present vehicle velocity is lower than 50 kilometers and the setting speed stage in step 123 is 3rd speed, steps 132 through 160 are skipped. In this way, the shift for 3rd speed is not done, and the time of the shift of the speed stage is decreased, so the feeling to the vehicle occupants is more comfortable. The step 131 is able to change to the step in FIG. 36. In this routine, if each of the vehicle velocity Vc and the throttle opening TH is small, then the shift for O/D speed is not done. Also, if the throttle opening TH is large, then the shift for 1st and 2nd stage is not done. In step 132 through 143, if the shift of the speed stage is to a higher stage, the index register X is set to the value of constant ECT-A/D-UT, and sub routine TEMPORARY TIMER SET is executed. Further, if flag F-DEL-UP is "0", then timer T-DEL-UP is set to 4 seconds and the timer is started. In step 138, the sub routine UP SHIFT PROHIBITION is executed. Timer T-DEL-UP is an up shift delay timer, and delays the change of the speed stage until the timer becomes "0". In steps 132 through 143, if the shift of the speed stage is a down shift, the index register X is set to a constant ECT-A/D-DT, and sub routine TEMPORARY TIMER SET is executed. Further, timer T-DIS-UP is set to 5 seconds and the timer is started. Also, flag F-DEL-UP is set to "0".

Figure 13:
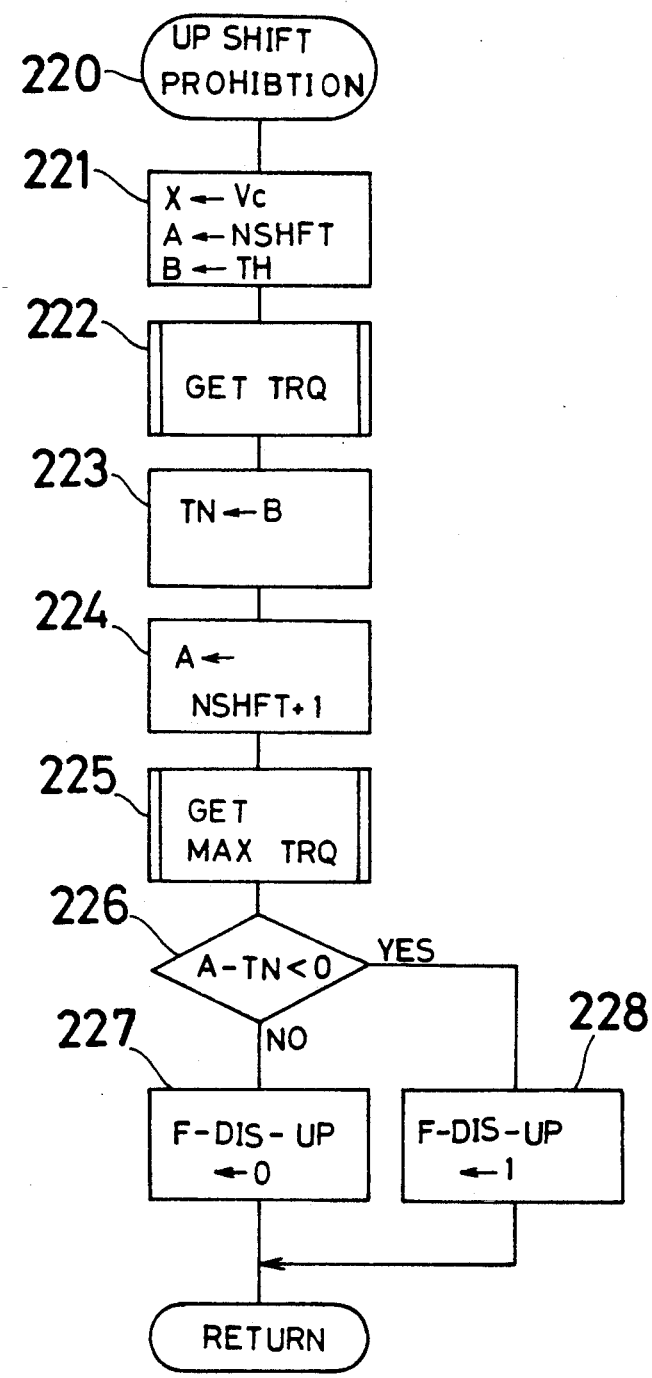
FIG. 13 is a flow chart showing a sub routine UP SHIFT PROHIBITION for the CPU.

The sub routine UP SHIFT PROHIBITION is shown in FIG. 13. In step 221, the index register X is set to the variable Vc (the present vehicle velocity), the register A is set to the variable NSHFT, which is the present shift position, and the register B is set to the variable TH (the present throttle opening). After that, the sub routine GET TRQ is executed.

Figure 16:
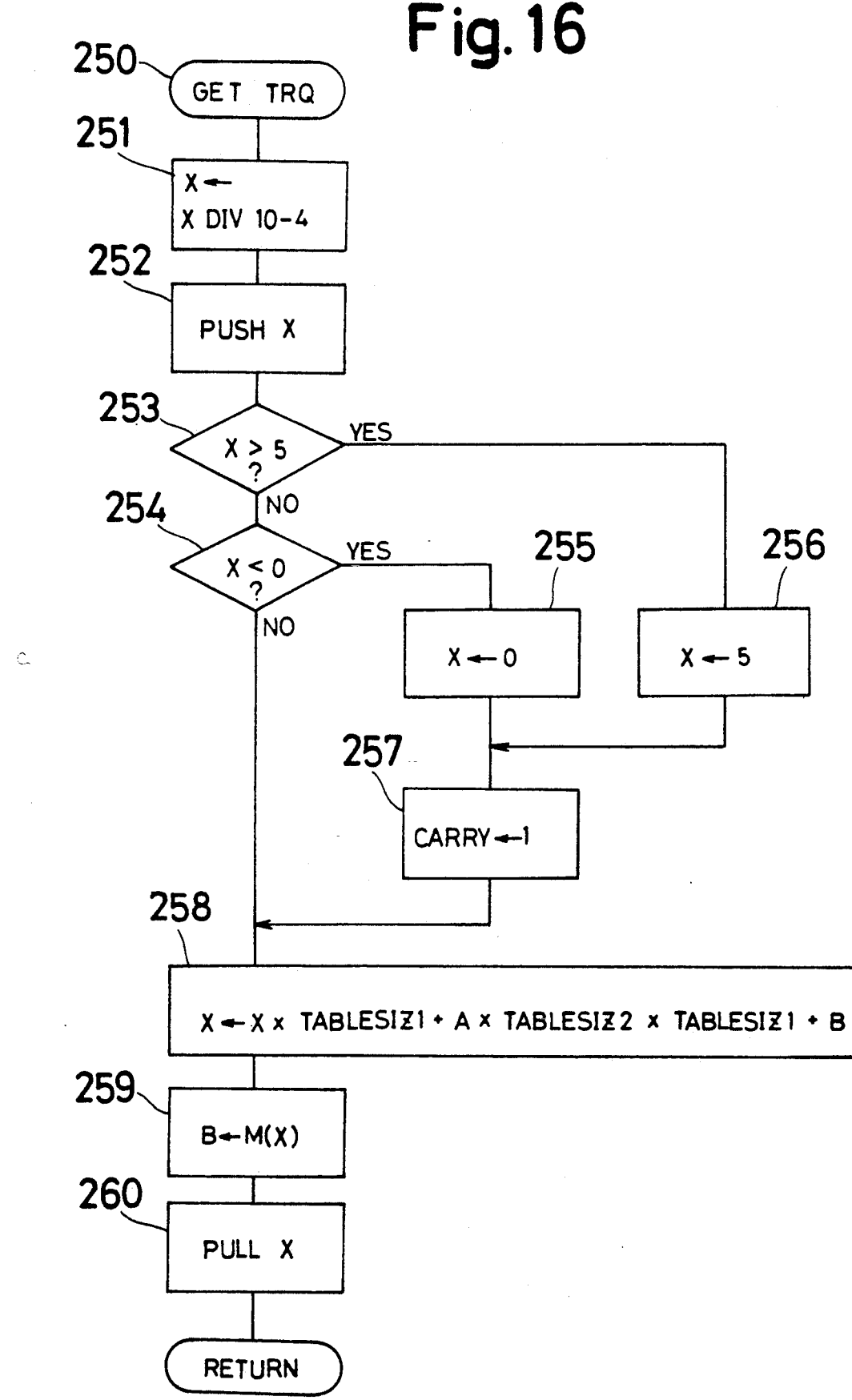
FIG. 16 is a flow chart showing a sub routine GET TRQ for the CPU.

The sub routine GET TRQ is shown in FIG. 16. Referring to FIG. 16, the index register X is set to a value by dividing the value of last index register X by 10 and by subtracting 4 (step 251). When a value after a decimal point occurs, then the value after the decimal point is omitted, because the index register X is not able to store the values after decimal point. For example, when the present vehicle velocity is 55 kilometers per hour, the value of index register X is changed to "1" after step 251. In step 251, the contents of index register X are stored in a stack. Then, if the value of index register X is larger than 5, the value of the index register X is replaced with 5, and flag CARRY is set to "1". If the value of index register X is smaller than 0, then the value of the index register is replaced with 0, and flag CARRY is set to "1". In step 258, the contents of the index register X are replaced with the value calculated by

X*TABLESIZ1+A*TABLESIZ2*TABLESIZ1+B.

Figure 24:
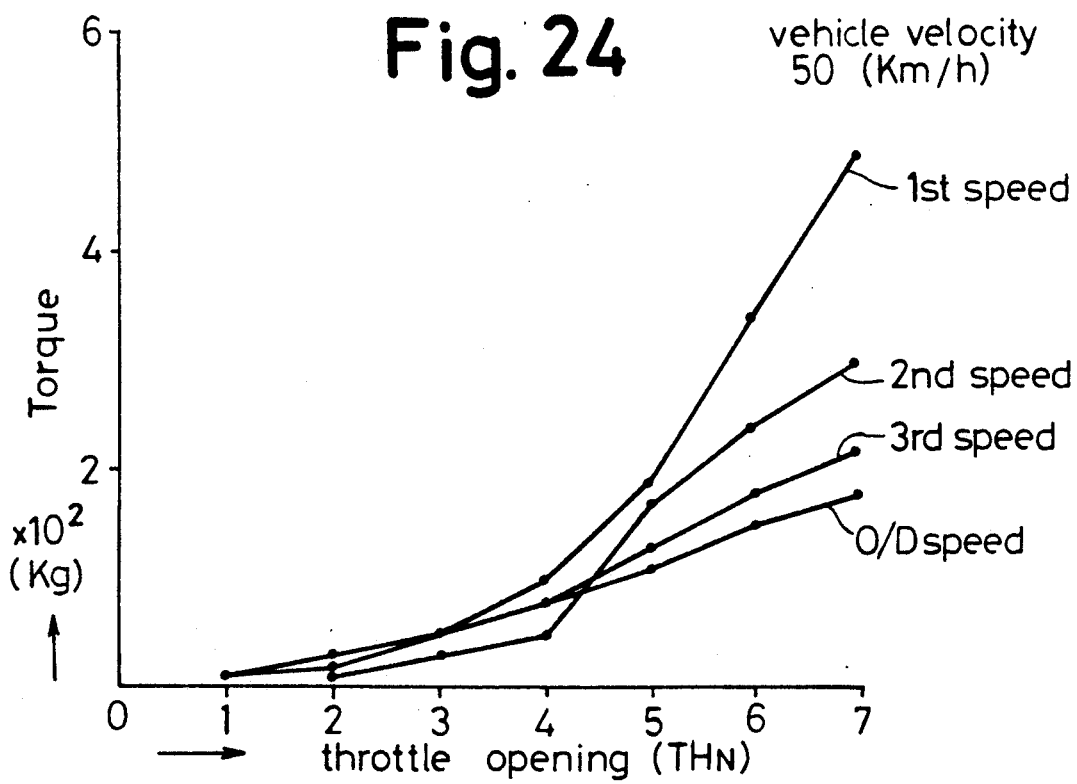
FIGS. 23 and 24 are graphs showing surveyed torques of a vehicle.
Figure 23:
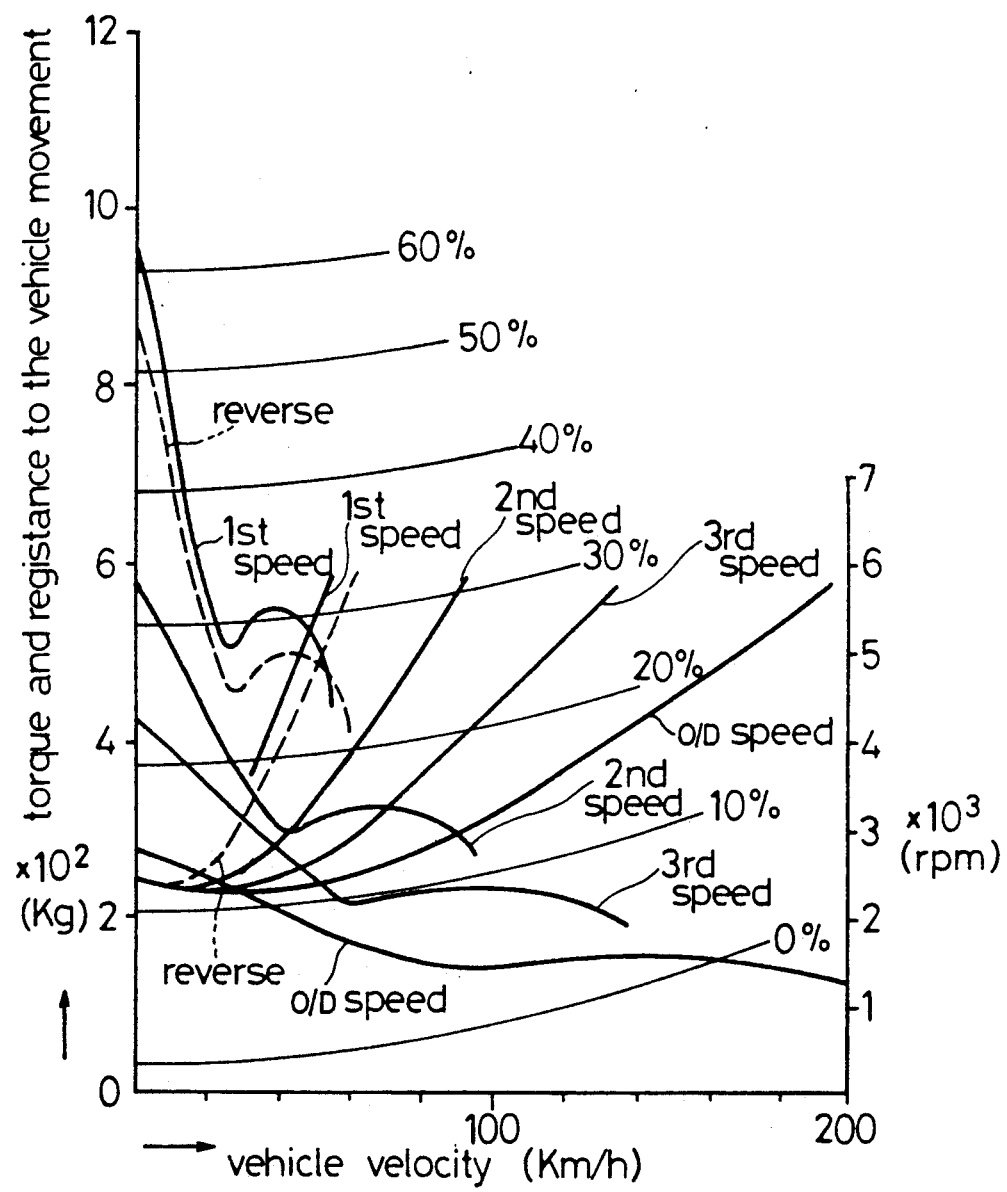
Figure 27:
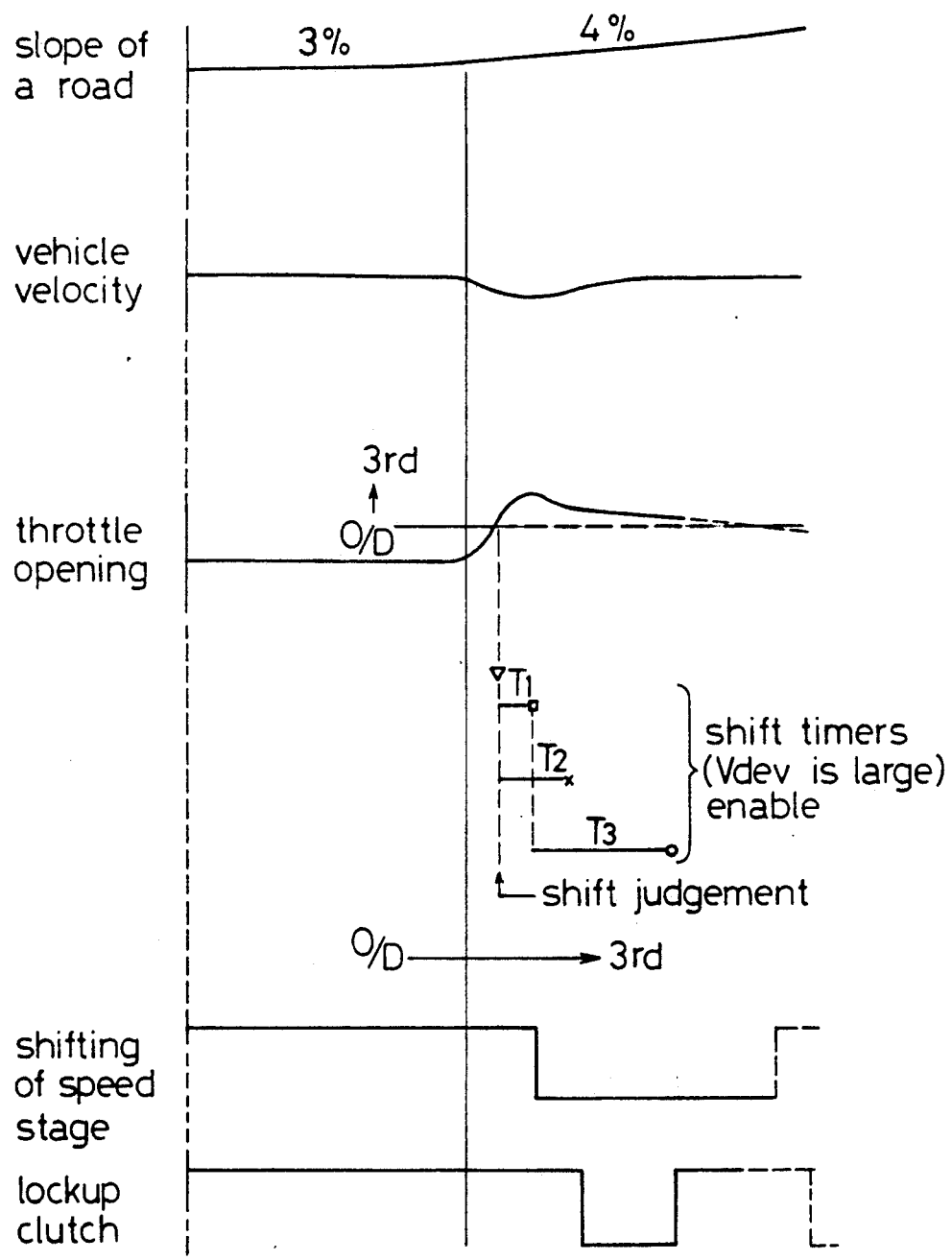
Figure 28:
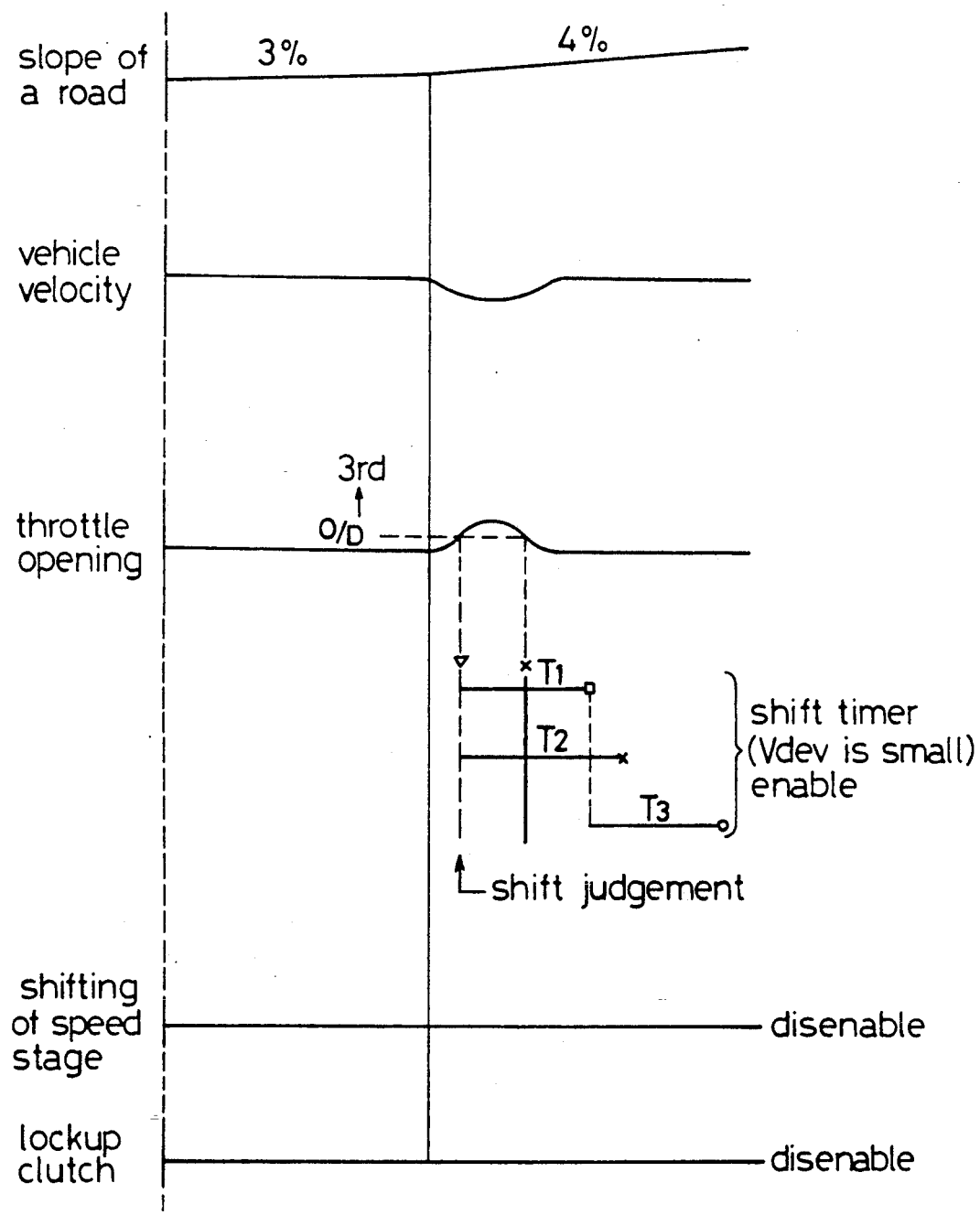
Figure 29:
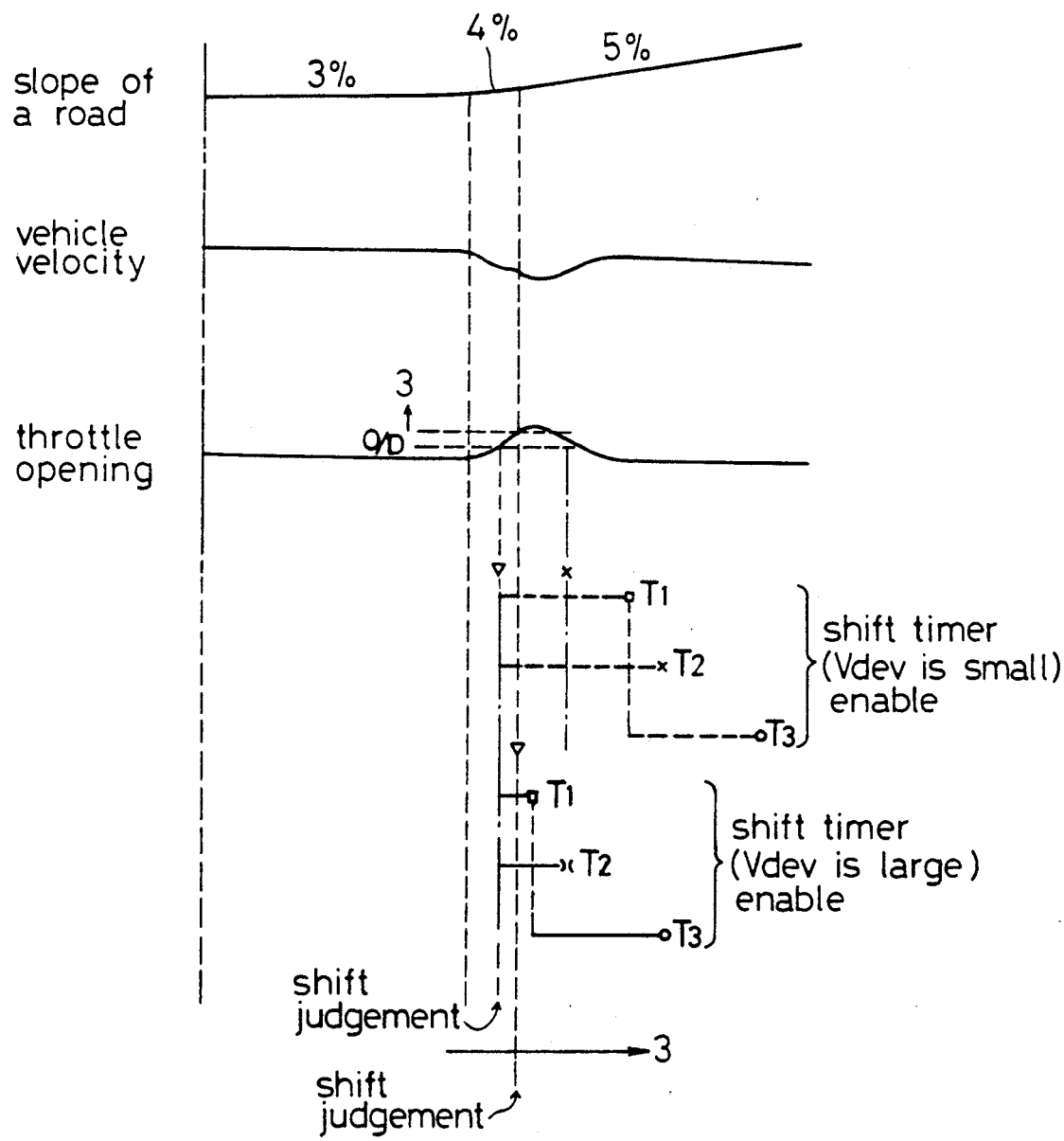

In step 259, the value indicated by the index register X is stored in the register B. The TABLESIZ1 is a constant and means the number of the tables, as shown in FIG. 26. Referring to FIG. 26, there are six tables. For example, if the value of the index register X is "1" (the present vehicle velocity is 50 through 59 kilometers per hour), then Index 1 of the table (B) is selected. The TABLESIZ2 is a constant and means the number of speed stages (4 in this embodiment). For example, if the vehicle velocity is 67 kilometers per hour and the present speed stage is 2nd speed and further the present throttle opening is "TH5", then the value "170" is stored in register B. After that, the value calculated by step 251 is placed in index register X again. Here, the torque stored in the torque data is created by FIG. 23. FIG. 23 shows the relationship of the torque which is surveyed, the throttle opening, the speed stage and the vehicle velocity. For example, when the vehicle velocity is 50 kilometers per hour, the torque is as shown in FIG. 24.

Referring to FIG. 13 again, a variable TN is set to the value of the register B, which is the value of the present torque of the vehicle. After that, the register A is set to the value by adding 1 to the variable NSHFT. Then, the sub routine GET MAX TRQ is executed.

The sub routine GET MAX TRQ is shown in FIG. 18. The index register X has been set to the value calculated as the variable Vc in the sub routine GET TRQ. In step 291, the value in register A is a replaced by a value calculated by subtracting 2 from the last value in the register A. The value in the index register X is replaced by a value calculated by multiplying the last value in the index register X by 3 and adding the value in the register A. Further, the value in the index register X is replaced by a value calculated by adding the constant TBL-MT to the last value in the index register X. In step 294, the register A is set to the contents of the address indicated by the index register X. The constant TBL-MT indicates the head address of the maximum torque data, and the register A contains a value which indicates the maximum torque of the vehicle, corresponding to the variable TN and the maximum torque data shown in FIG. 26. The variable TN shows the present torque, and the variable Vc shows the present vehicle velocity.

Referring to FIG. 13 again, in step 226, if the value of the variable TN is larger than the contents of the register A (the present torque is larger than the maximum torque), then flag F-DIS-UP is set to "1", and if the value of the variable TN is smaller than the contents of the register A (the present torque is smaller than the maximum torque), then flag F-DIS-UP is set to "0". Thus, in this sub routine, when the present torque is larger than the maximum torque, flag F-DIS-UP is set to "1" and the up shift of the speed state is prohibited.

Referring to the sub routine SHIFT CHANGE (FIGS. 7, 8 and 9) again, in step 144 (FIG. 8), if timer T-DEL-UP is "0" then flag F-DEL-UP is set to "0" and the shift of the speed stage is allowed. After that, if the timers T-T1, T-T2, T-T3, T-T4 and T-T5 are all "0" (the shift of speed stage is not done at the present time), then the variables T1-TEM through T5-TEM are set to the timers T-T1 through T-T5, and timers T-T1, T-T2 and T-T4 are started. If one of the timers T-T1 through T-T5 is not "0", the deviation Vdev is set to the absolute value of the difference between the present vehicle velocity and the setting vehicle velocity. When the deviation is larger than 3 kilometers per hour, the values of the timers T-T1 through T-T5 are changed by subtracting the value of the passage time of the timers from the value of the temporary timers. The value of the passage time of the timers is calculated by subtracting the value of the present time of the timers form the value of the last temporary timers. If the changed value is less than zero, the changed value is replaced with zero. In this way, if the deviation Vdev is large, the value of the timers is decreased, and the shift of the speed stage occurs earlier. As shown in FIG. 19, when the deviation Vdev is small, the speed stage is not shifted for small changes of the throttle opening. As shown in FIG. 18, when the deviation is large, the shift of the speed stage is done for small changes of the throttle opening. In this way, when the deviation Vdev is large, the sensitivity is increased.

When timer T-T1 is "0" or the timer T-T1 ends, timer T-T3 ends, timer T-T3 is started (step 163). The end of timer T-T1 is at the time that the timer T-T1 is nearly "0". After that, when timer T-DIS-UP is "0" and flag F-DWN is "1" and when the timer T-DIS-UP is "0", Flag F-DWN is "0" and flag F-DIS-UP is "0", the data of the speed stage is sent to the output ports P21 and P23 (step 167). In short, when the up shift is not allowable, the shift of the speed stage of the transmission is not executed.

When timer T-T2 is "0" and timer T-T3 is not "0", high level voltage is sent from the output port P25 which is for lockup clutch control, so that the lockup clutch is disengaged. If timer T-T3 is at an end (T-T3 is "0"), then the value calculated by the shift and lockup judgment in step 108 is sent to the output port P25.

When timer T-T4 is "0" and the timer T-T4 is at an end, timer T-T5 is started. The end of timer T-T4 is at the time that the timer T-T4 is nearly "0".

Figure 20:
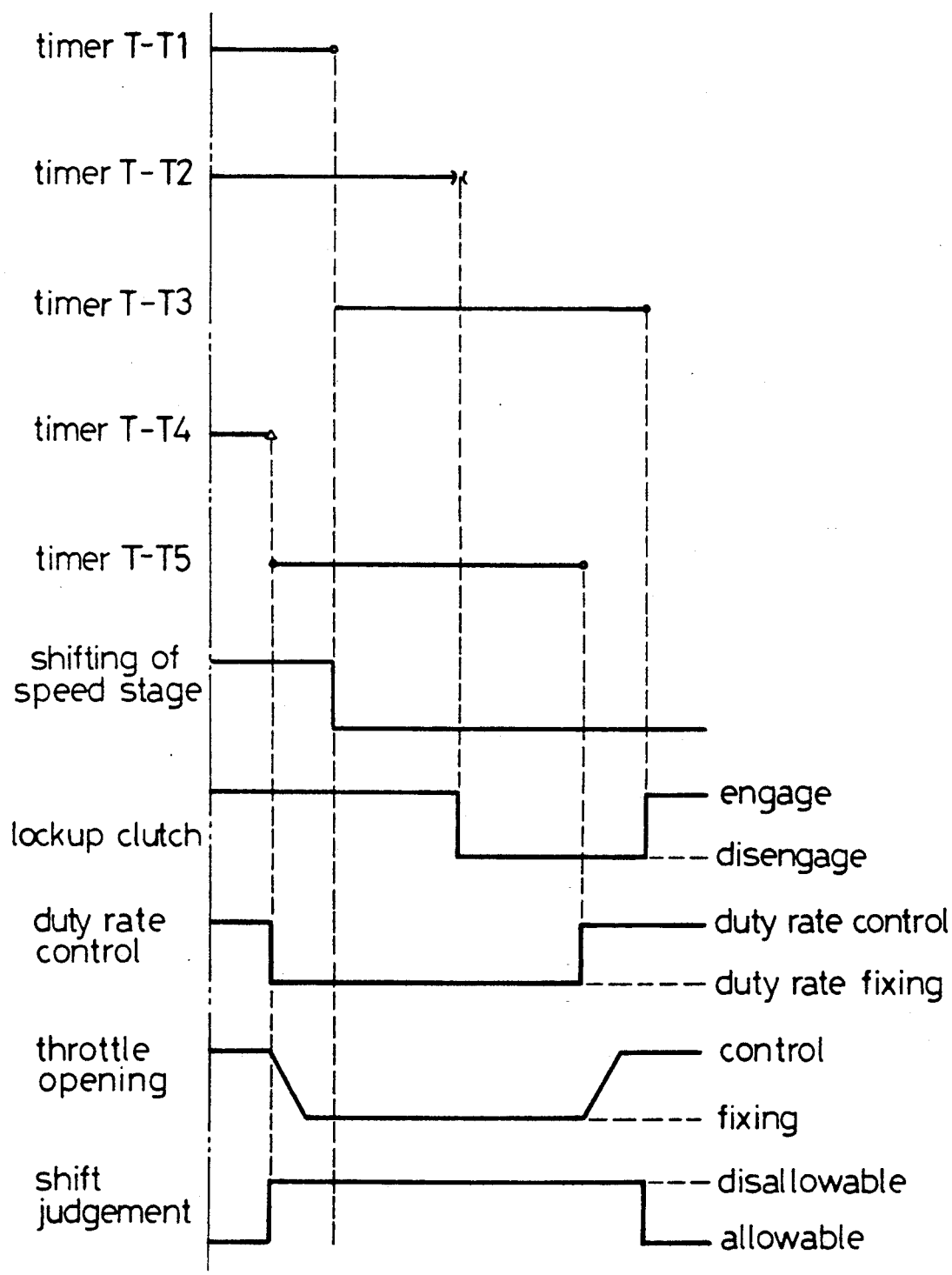
FIGS. 20, 21, 27, 28 and 29 are operational diagrams showing the operation of the timers of the CPU.

For example, the state of timer T-T1, T-T2, T-T3, T-T4 and T-T5 and the states of shift of the speed stage and lockup clutch are shown in FIG. 20. Referring to FIG. 20, the shift of the speed stage is done at the end of timer T-T1. The lockup clutch is disengaged a the end of timer T-T2, and engaged at the end of timer T-T3. The fixing duty rate control that is described later is started at the end of timer T-T4, and ended at the end of timer T-T5.

After the timer operation, sub routine SOLENOID ABNORMAL DETECTING is executed (step 175). This routine is an abnormal detecting means. Referring to FIG. 1, when the output port P21 is high level, if the solenoid SL1 is normal, the input port P22 is turned to low level, and if the solenoid SL1 is opened, the input port P22 is turned to high level. When the output port P21 is low level, if the solenoid SL1 is normal, the input port P22 is turned to high level, and if each side of the solenoid SL1 is short circuited, then the input port P22 is turned to low level. In this way, if the solenoid SL1 is normal, when the output of the output port P21 is "1" (high), the input of the input port P22 is changed to "0" (low), and when the output is "0" (low), the input is "1" (high). The relation of the other output ports P23 and P24 and input ports P24 and P26 are same. Accordingly, if the value sent to the output port of a solenoid is equal to the value received at the input port of the solenoid, the failure of the solenoid is detected. Referring to FIG. 15, if the output data for solenoids is equal to the input data, then flag F-FAIL is set to "1" and the failure of the solenoid is able to be detected. When the solenoid is normal, flag F-FAIL is set to "0".

Figure 10:
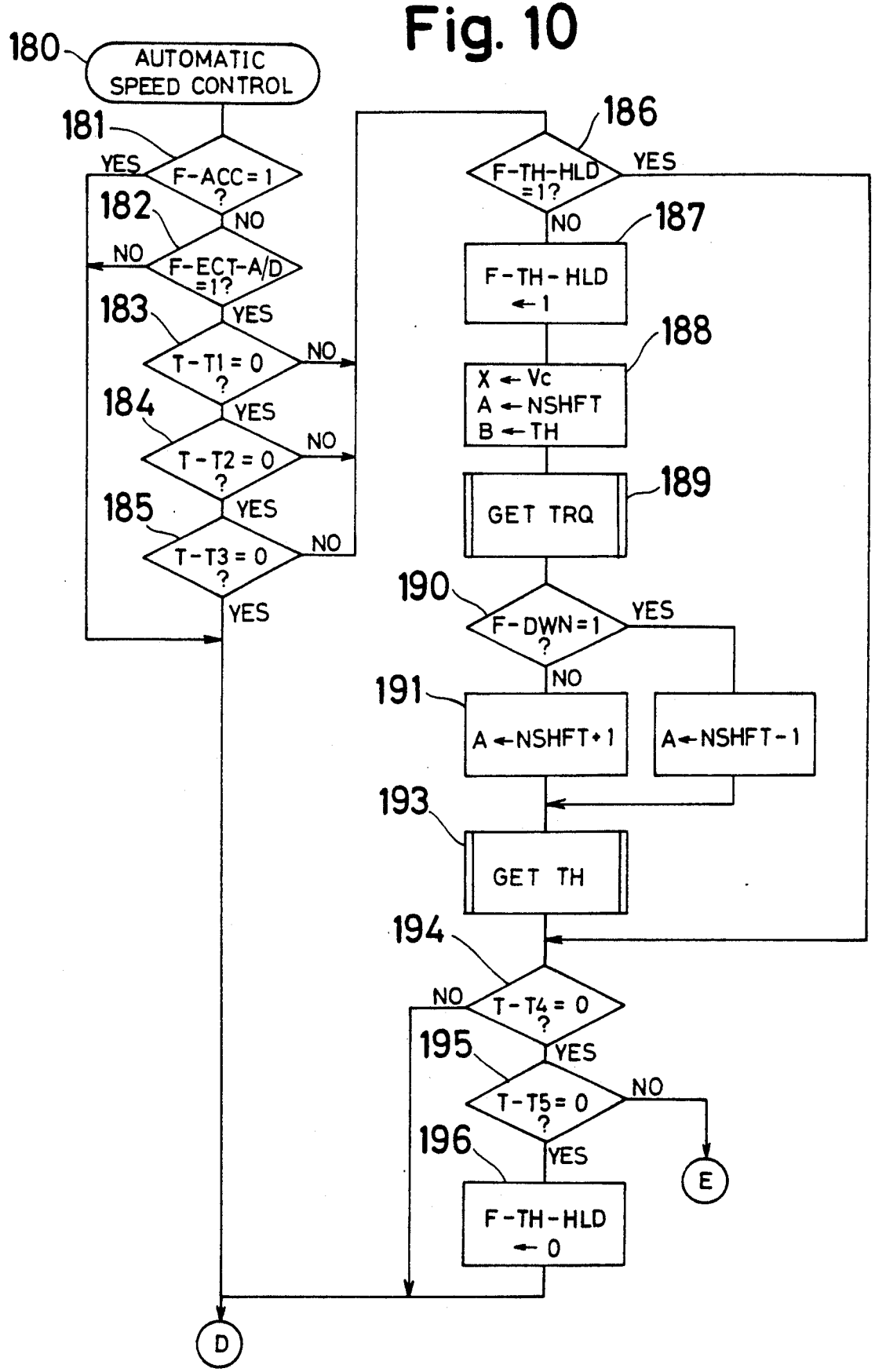
FIGS. 10 through 12 are flow charts showing a sub routine AUTOMATIC SPEED CONTROL for the CPU.
Figure 11:
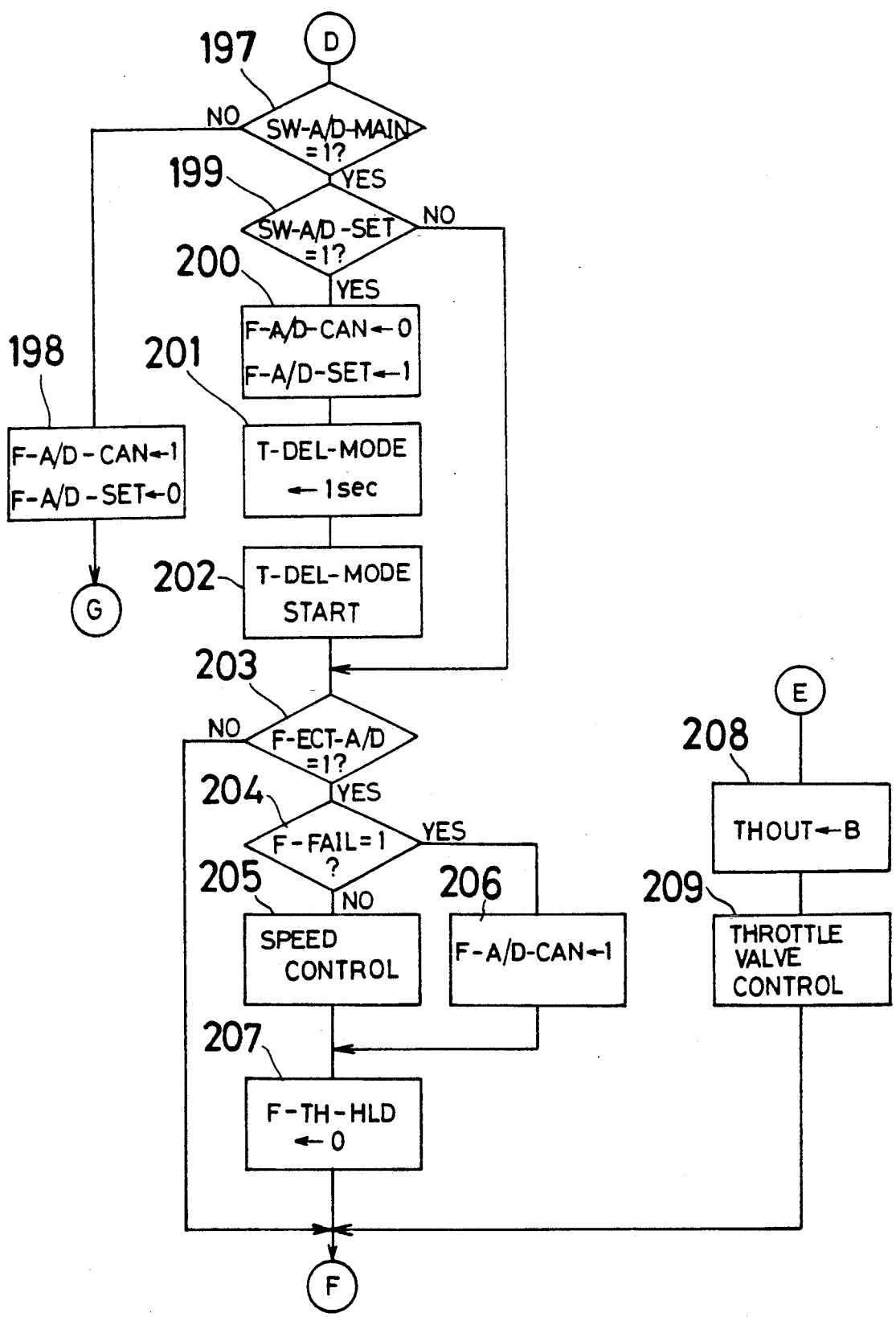
Figure 12:
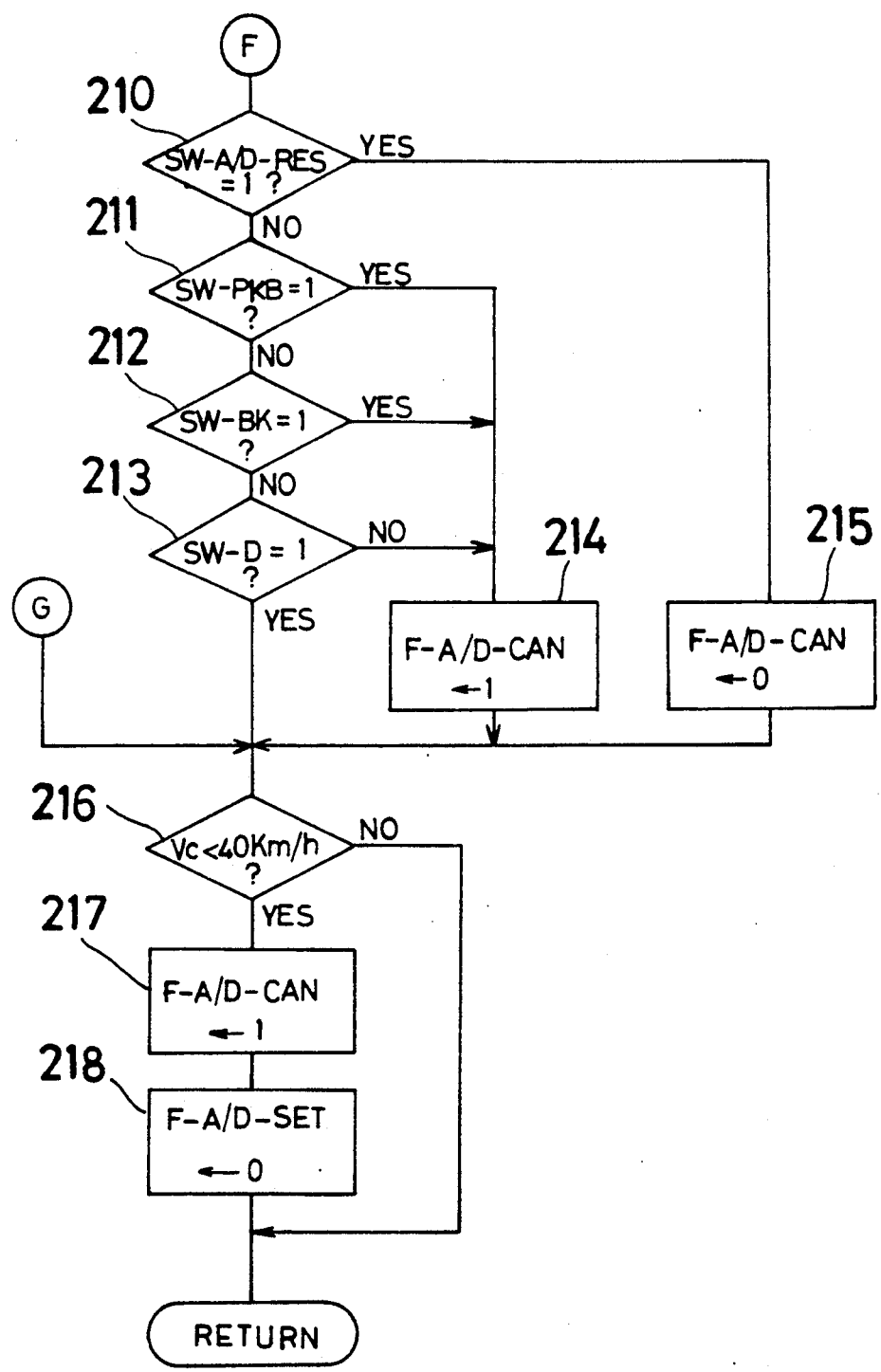

The sub routine AUTOMATIC SPEED CONTROL, as shown in FIGS. 10, 11 and 12, is executed after sub routine SHIFT CHANGE. When flag F-ACC is "0" and flag F-ECT-A/D is "1" and one of timers T-T1, T-T2 and T-T3 is not "0" at least, step 186 is executed. In step 186, if flag F-TH-HLD is "1", then step 194 is executed. The flag F-TH-HLD is for change states whether the fixed duty rate control is executed or not. When flag F-TH-HLD is "0", then the flag F-TH-HLD is turned to "1" (step 187). In step 188, index register X is set to variable Vc (present vehicle velocity), register A is set to variable NSHFT which is a present shift position, and register B is set to variable TH (present throttle opening). After that, sub routine GET TRQ is executed. In the sub routine, the present torque is stored in the register B. After sub routine GET TRQ, if the judgment of the shift of the speed stage is down shift, then a value calculated by subtracting 1 from NSHFT is placed in register A. If the judgment is up shift, then a value calculated by adding 1 to NSHFT is placed to register A. After that, the sub routine GET TH is executed.

Figure 17:
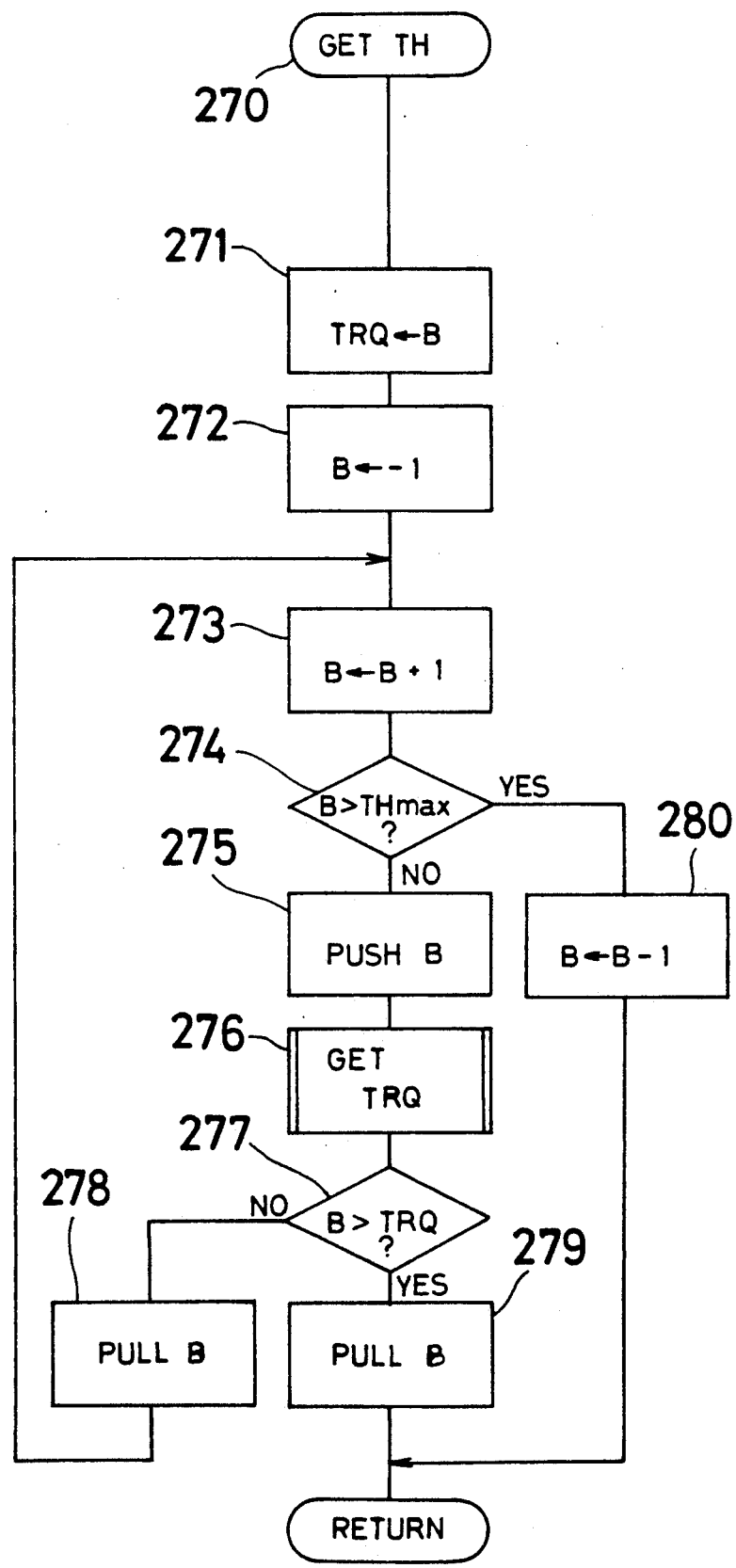
FIG. 17 is a flow chart showing a sub routine GET TH for the CPU.
Figures 18, 26:
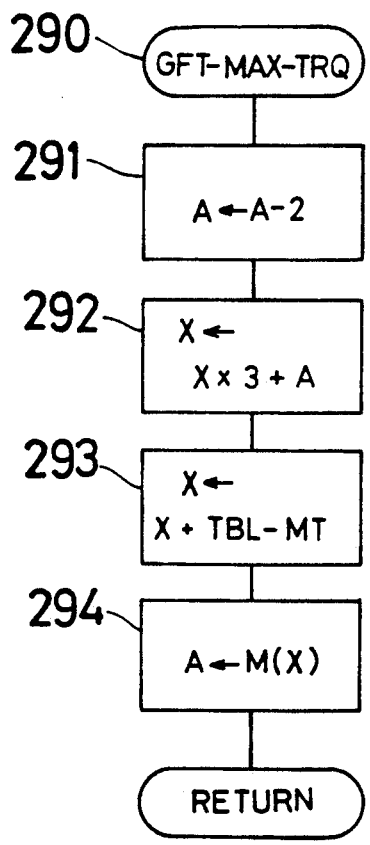
FIG. 18 is a flow chart showing a sub routine GET MAX TRQ for the CPU.
FIG. 26 is a table showing a maximum torque diagram which is stored in the CPU.

Referring to FIG. 17, the variable TRQ is set to the value in register B, which contains the torque of the vehicle in the subroutine GET TRQ. The register B is set to a value "−1" (step 272). As the operation enters the loop consisting of steps 273 through 278, a value of +1 is added to the register A (step 273). When the contents of register B are smaller than a constant THmax, the contents of register B are stored to the stack, and sub routine GET TRQ is executed. In this subroutine GET TRQ, the torque of the vehicle is stored to the register B. If the value of the register B is not larger than variable TRQ, then the register B is set again to the value that is stored in step 275 and the operation is returned to step 273. If the value of register B is larger than variable TRQ, then register B is set again to the value that is stored in step 275. In these steps, the torque of the vehicle after the shift of the speed stage is calculated when the value of register A, which means the throttle opening is 0 through 7, and register B is stored with the torque at the time that the torque is larger than the present torque TRQ. If the torque is not larger than the present torque TRQ at the maximum throttle opening, then the register B is stored with the value THmax, indicating the maximum throttle opening.

Referring to FIG. 10 again, if the timer T-T4 is not "0", then step 197 is executed. If the timer T-T4 is "0" and the timer T-T5 is "0", then flag F-TH-HLD is set to "0" and step 197 is executed. If the timer T-T4 is "0" and the timer T-T5 is not "0", then the fixed duty rate control is executed in stops 208 and 209 in FIG. 11. Referring to FIG. 11, the variable THOUT is set to the value of register B that is stored with the value of the throttle opening after the shift of the speed stage. In step 209, the output port P29 is turned to low level, and the output ports P27 and P28 are controlled to keep the duty rate corresponding to the value of the variable THOUT (that is the fixed duty rate control).

Figure 21:
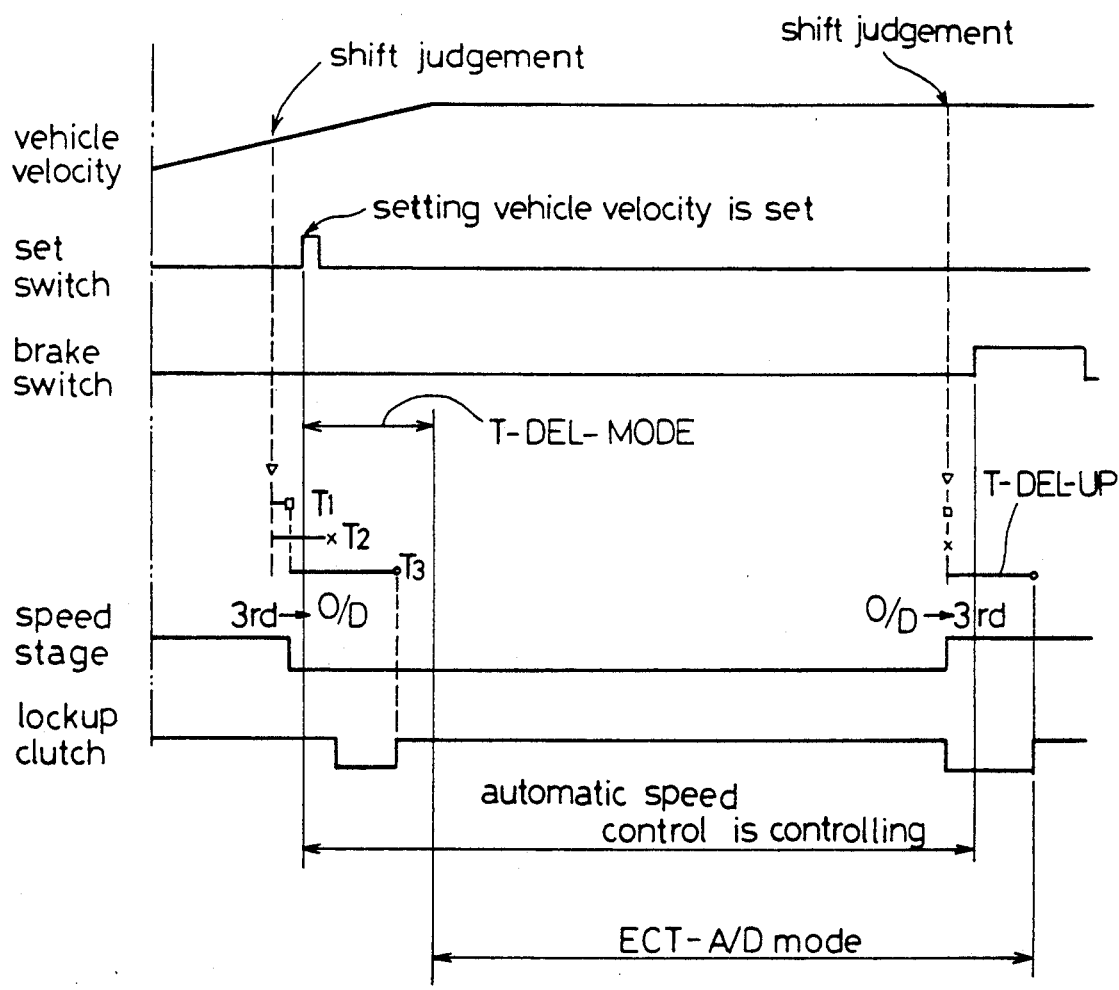
Figure 35:
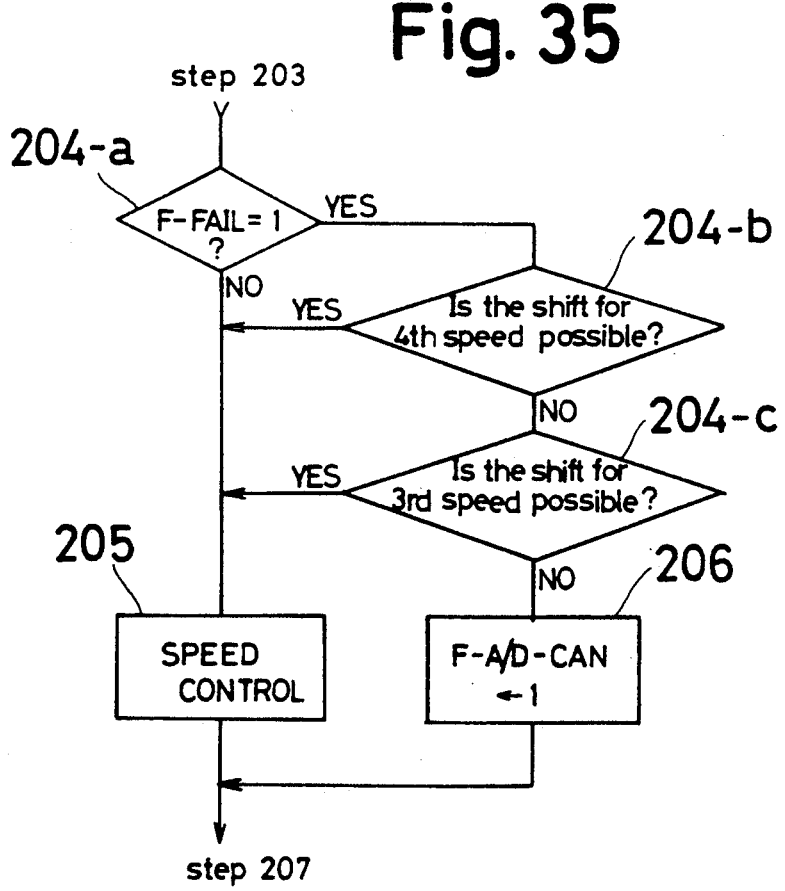
FIG. 35 is a fragmentary flow chart showing a modified form of the sub routine AUTOMATIC SPEED CONTROL shown in FIG. 11.

In step 197, if flag SW-A/D-MAIN is "0", then flag F-A/D-CAN is set to "1", flag F-A/D-SET is set to "0" and the step 216 is executed. If flag SW-A/D-MAIN is "1" and flag SW-A/D-SET is "1", then the flag F-A/D-CAN is set to "0" and flag F-A/D-SET is set to "1". Further, timer T-DEL-MODE is set to one second and the timer is started. Thus, the timer T-DEL-MODE is started at ECT-A/D mode when the set switch SP is turned ON and delays the change of modes. For example, this relationship is shown in FIG. 21. When the mode is changed, the speed stage is apt to shift, a shift of the speed stage does not occur at the same time the automatic speed control is set. Referring to FIG. 11 again, when flag F-ECT-A/D is "1", and flag F-FALL is "0", the SPEED CONTROL routine (step 205) is executed. In this step, the vehicle velocity is held by controlling the duty rate of the output for the release valve RV and the control valve CV. Then flag F-TH-HLD is set to "0" (step 207), and the fixed duty rate control is cancelled. If the flag F-FALL is "1", then flag F-A/D-CAN is set to "1", the automatic control is cancelled, and flag F-TH-HLD is set to "0". If the flag F-ECT-A/D is "0", then the sequence of steps 204 through 207 is not executed. In this routine, if the automatic transmission control system has a failure, the automatic speed control is cancelled. When a shift of the speed stage occurs by control of the throttle valve by the automatic speed control, if the solenoid of the transmission has failed, then the shift may be an unexpected shift. For example, when the solenoid SL2 fails to hold the "OFF" state, the speed stage of the transmission can be only 1st speed or O/D speed. At this time, if the automatic speed control changes the stage very often between 1st speed and O/D speed due to changes in the grade of the road, the shock on the vehicle is very large and dangerous. But, in the present embodiment, this danger does not occur. Here, when the solenoid fails, the danger of a shift to the upper side of the speed stage is smaller than for the lower side. Thus, when a shift to the upper side of the speed stage occurs, the automatic speed control may be continued. This case is shown in FIG. 35. In step 204-a, when the flag F-FALL is "1", if a shift to 3rd stage or O/D stage occurs, then the speed control is executed.

Referring to FIG. 11 again, in steps 210 through 215, the cancelling of the automatic speed control is executed. If flag SW-A/D-RES is "1", then flag F-A/D-CAN is set to "0", and the automatic speed control is cancelled. When flag SW-A/D-RES is "0", if flag SW-PKB is "1", or if flag SW-BK is "1", or if flag SW-D is not "1", then flag F-A/D-CAN is set to "1", and the automatic speed control is cancelled.

In steps 216 through 218, if the present vehicle velocity is under 40 kilometers per hour, flag F-A/D-CAN is set to "1" and flag F-A/D-SET is set to "0". Accordingly, the automatic speed control is cancelled if the vehicle velocity is too low.

What is claimed is:

1. A speed control system for a vehicle having an automatic transmission with an operating condition corresponding to a plurality of shiftable speed stages, comprising:

automatic speed control means operative when switched from an inactive state to an active state for maintaining the velocity of the vehicle at a set vehicle velocity selected by the operator of the vehicle; and automatic transmission control means, including first stored data for controlling, when selected, the shifting of the automatic transmission in accordance with a first set of vehicle operating parameters, and including second stored data for controlling, when selected, the shifting of the automatic transmission in accordance with a second set of vehicle operating parameters different from the first set of vehicle operating parameters, selecting means responsive to the inactive state of the automatic speed control means for selecting the first stored data to control the shifting of the automatic transmission of the vehicle and responsive to the active state of the automatic speed control means for selecting the second stored data to control the shifting of the automatic transmission of the vehicle; the automatic transmission control means being governed by the automatic speed control means when in the active state in accordance with the operating condition of the automatic transmission and the deviation between the actual vehicle velocity and the set vehicle velocity of the automatic speed control means to control the shifting of the automatic transmission in accordance with the selected second stored data.

2. A vehicle speed control system according to claim 1, wherein the vehicle includes a throttle valve having a plurality of throttle openings, and first and second stored data of the automatic transmission control means includes data relating to the magnitude of the throttle opening, and the means for automatically shifting the speed stage of the automatic transmission of the vehicle is in accordance with the magnitude of the deviation between the actual vehicle velocity and the set vehicle velocity of the automatic speed control means and the second stored data including data relating to the throttle opening of the throttle valve of the vehicle.

3. A vehicle speed control system according to claim 1, wherein the automatic transmission control means includes means for automatically shifting the speed stage of the automatic transmission of the vehicle in accordance with both the second stored data and the magnitude of the deviation between the actual vehicle velocity and the set vehicle velocity of the automatic speed control means in the active state, and the magnitude of the actual vehicle velocity.

4. A vehicle speed control system according to claim 1, wherein the automatic transmission control means includes a large deviation means for selectively shifting the speed stage of the automatic transmission of the vehicle in response to deviations between the actual vehicle velocity and the set vehicle velocity greater than a predetermined value at times when the speed control means is active.

5. A vehicle speed control system according to claim 4, wherein the automatic transmission control means further comprises delay means for delaying for a predetermined period the shifting of the speed stage of the automatic transmission of the vehicle at times when the speed control means is active.

6. A vehicle speed control system according to claim 5, wherein the delay means includes means for shortening the predetermined delay period of the shifting at times when the deviation between the actual vehicle velocity and the set vehicle velocity is greater than a predetermined value at times when the speed control means is active.

7. A vehicle speed control system according to claim, 1 wherein the automatic transmission control means includes velocity and throttle control means for controlling the shifting of the speed stage in response to the output shaft RPM and the throttle opening, and means for suppressing a shift from the operating speed stage to the next speed stage in response to at least one of the output shaft RPM and the throttle opening.

8. A vehicle speed control system according to claim 7, wherein the automatic transmission control means includes means for prohibiting shifting of the speed stage to a higher speed stage at times when the output shaft RPM and the throttle opening are both below predetermined levels.

9. A vehicle speed control system according to claim 7, wherein the automatic transmission control means includes means for inhibiting down shift of the speed stage to a lower speed stage at times when the output shaft RPM and the throttle opening are both greater than preset levels.

10. The speed control system of claim 7, wherein the automatic transmission control means includes shift detection means for detecting shifting from one speed stage to another, and the automatic transmission control means comprises means for rendering the shift detection means inoperative at times when the throttle opening control means is controlling the throttle valve during shifting from one speed stage to another.

11. The speed control sytem of claim 1 wherein the first stored data and the second stored data include operating condition parameters for the shifting of the speed stage in accordance with the throttle opening and output shaft RPM.

12. The speed control system of claim 1 wherein the first stored data and the second stored data include operating condition parameters for the locking up of the speed stage in accordance with the throttle opening and output shaft RPM.

13. The speed control system of claim 1, wherein the automatic transmission control means includes means for delaying effective activation and deactivation of the speed control means during shifting of the automatic transmission from one stage to another.

* * * * *